(12) United States Patent
Vogiatzakis et al.

(10) Patent No.: US 12,436,588 B2
(45) Date of Patent: Oct. 7, 2025

(54) POWER CONVERSION RETROFIT SYSTEM FOR WIRELESS COMMUNICATION SYSTEMS

(71) Applicant: RAYCAP S.A., Athens (GR)

(72) Inventors: Charalampos Vogiatzakis, Chania (GR); Konstantinos Angelis, Koropi (GR); Elias Fermelis, Koropi (GR); Anestis Kolovos, Serres (GR); Stavros Georgiadis, Athens (GR); Shawn A. Warner, Rathdrum, ID (US); Michael C. Bloxham, Mead, WA (US)

(73) Assignee: RAYCAP S.A., Athens (GR)

(*) Notice: Subject to any disclaimer, the term of this patent is extended or adjusted under 35 U.S.C. 154(b) by 394 days.

(21) Appl. No.: 18/173,657

(22) Filed: Feb. 23, 2023

(65) Prior Publication Data

US 2023/0276592 A1 Aug. 31, 2023

Related U.S. Application Data

(60) Provisional application No. 63/314,816, filed on Feb. 28, 2022.

(51) Int. Cl.
| | | |
|---|---|---|
| *G06F 1/26* | (2006.01) | |
| *H02M 1/32* | (2007.01) | |
| *H02M 3/158* | (2006.01) | |
| *H05K 7/14* | (2006.01) | |

(52) U.S. Cl.
CPC ............ *G06F 1/263* (2013.01); *H02M 1/325* (2021.05); *H02M 3/158* (2013.01); *H05K 7/14322* (2022.08); *H05K 7/14324* (2022.08)

(58) Field of Classification Search
CPC ..... G06F 1/263; H02M 1/325; H05K 7/14322
See application file for complete search history.

(56) References Cited

U.S. PATENT DOCUMENTS

| | | | |
|---|---|---|---|
| 8,730,639 B1 * | 5/2014 | Wilson | H01Q 1/50 361/118 |
| 9,099,860 B2 | 8/2015 | Martinez | |
| 9,448,576 B2 | 9/2016 | Chamberlain | |

(Continued)

FOREIGN PATENT DOCUMENTS

WO 2022/182652 A1 9/2022

OTHER PUBLICATIONS

International Search Report and Written Opinion for PCT/IB2023/000087 dated Oct. 9, 2023; 11 pages.

(Continued)

*Primary Examiner* — Scott Bauer
(74) *Attorney, Agent, or Firm* — Schwabe Williamson & Wyatt

(57) ABSTRACT

A power boost retrofit system for a power communications system having an existing base overvoltage protection unit, where one end of DC power cables is connected to remote radio heads (RRHs). The power conversion retrofit system includes one or more pluggable DC voltage conversion (DCVC) modules containing DC-DC converters are inserted into respective slots in a front of an enclosure of the base overvoltage protection unit. A connectivity and control (CC) module is inserted into a rear of the enclosure to mate with the DCVC modules and to connect with an opposite end of DC power cables.

23 Claims, 18 Drawing Sheets

(56) References Cited

U.S. PATENT DOCUMENTS

| | | | |
|---|---|---|---|
| 10,025,335 B2 | 7/2018 | Chamberlain | |
| 10,128,685 B2 | 11/2018 | Hanley | |
| 10,423,180 B2 | 9/2019 | Chanberlain | |
| 10,782,720 B2 | 9/2020 | Guerin | |
| 10,812,664 B2 | 10/2020 | Kostakis | |
| 10,912,025 B2 | 2/2021 | Coleman | |
| 10,971,928 B2 | 4/2021 | Warner | |
| 2014/0168842 A1* | 6/2014 | Martinez | H02H 9/04 361/91.1 |
| 2018/0164355 A1 | 6/2018 | Winkler | |
| 2018/0213091 A1* | 7/2018 | Kostakis | G05F 1/468 |
| 2018/0337526 A1* | 11/2018 | Al-Mufti | H02H 9/04 |
| 2019/0377394 A1 | 12/2019 | Klaba | |
| 2019/0391192 A1* | 12/2019 | Winkler | H04W 52/0274 |
| 2020/0213940 A1 | 7/2020 | Gandhi | |
| 2021/0072779 A1 | 3/2021 | Guerin | |
| 2023/0273661 A1 | 8/2023 | Kolovos et al. | |
| 2024/0297582 A1 | 9/2024 | Vogiatzakis et al. | |

OTHER PUBLICATIONS

International Search Report and Written Opinion issued in PCT Application No. PCT/IB2023/000107 dated Jul. 12, 2023; 12 pages.

\* cited by examiner

| Trunk cable gauge | 6AWG | | 4AWG | | 3AWG | |
|---|---|---|---|---|---|---|
| Targeted RRH Voltage | -54Vdc | -58Vdc | -54Vdc | -58Vdc | -54Vdc | -58Vdc |
| Power at RRH | 1020W | 1740W | 2160W | 2320W | 2700W | 2900W |
| Maximum cable loop length | 1680ft | 1340ft | 1720ft | 1600ft | 2020ft | 1920ft |

FIG. 8

POWER CONVERSION RETROFIT SYSTEM FOR WIRELESS COMMUNICATION SYSTEMS

CROSS-REFERENCE TO RELATED APPLICATIONS

This application claims the benefit of provisional Patent Application Ser. No. 63/314,816, filed Feb. 28, 2002, and assigned to the assignee of the present application.

COPYRIGHT NOTICE

A portion of the disclosure of this patent document contains material which is subject to copyright protection. The copyright owner has no objection to the facsimile reproduction by anyone of the patent document or the patent disclosure, as it appears in the United States Patent and Trademark Office patent file or records, but otherwise reserves all copyright rights whatsoever.

TECHNICAL FIELD

One or more implementations relate generally to a power transmission system for wireless communication systems, and in particular to a power conversion retrofit system for a wireless communication system.

BACKGROUND

In a split Radio Base Station (RBS) architecture, the typical RBS comprises a base band unit (BBU) and remote radio heads (RRH) connected by cabling. Power to the RRH is provided through copper cables from the base station to the top of the tower or roof top. This creates a conductive path, making the active equipment at the top and the base of the site vulnerable to damage by direct lightning strikes. Overvoltage protection (OVP) systems installed in front of both the BBU and the RRH must be able to withstand direct lightning currents to protect the sensitive equipment.

DC-DC converters are coupled at inputs to a power input, and coupled at outputs to a base end of DC power cables to output a voltage over the DC power cables to the RRHs connected at an opposite end of the DC power cables. Typically, the DC-DC converters 210 are installed with the other components of the base station during construction. However, some existing power transmission systems were completed without DC-DC converters installed.

There is a need, therefore, for a system and method for installing or retrofitting DC-DC converters in an existing power transmission system.

BRIEF DESCRIPTION OF THE DRAWINGS

The included drawings are for illustrative purposes and serve to provide examples of possible structures and operations for the disclosed inventive systems, apparatus, methods and computer-readable storage media. These drawings in no way limit any changes in form and detail that may be made by one skilled in the art without departing from the spirit and scope of the disclosed implementations.

FIG. 5B-1 is a simplified block diagram showing connections of the DCVC module and the CC module of the power conversion retrofit system when installed in the overvoltage protection unit.

FIG. 5B-2 is a block diagram showing connections of the DCVC module and the CC module of the power conversion retrofit system in an implementation where the DCVC module is a full-scale converter system.

FIG. 8 illustrates a table providing an overview of the maximum power delivered by retrofitted base overvoltage protection unit to the RRH and the maximum loop circuit length for various gauge trunk cables and targeted top RRH voltages.

DETAILED DESCRIPTION

Embodiments describe a power conversion retrofit system that enables DC-DC converters to be retrofitted or installed in an existing power communications system to compensate for the voltage drop from the voltage control system on cables. The power conversion retrofit system is designed for integration with an existing base overvoltage protection unit in place of fiber optical modules.

The following description is presented to enable one of ordinary skill in the art to make and use the invention and is provided in the context of a patent application and its requirements. Various modifications to the disclosed embodiments and the generic principles and features described herein will be readily apparent. The disclosed embodiments are mainly described in terms of particular methods and systems provided in particular implementations. However, the methods and systems will operate effectively in other implementations. Phrases such as "disclosed embodiment", "one embodiment" and "another embodiment" may refer to the same or different embodiments. The embodiments will be described with respect to systems and/or devices having certain components. However, the systems and/or devices may include more or less components than those shown, and variations in the arrangement and type of the components may be made without departing from the scope of the invention. The disclosed embodiments will also be described in the context of particular methods having certain steps. However, the method and system operate effectively for other methods having different and/or additional steps and steps in different orders that are not inconsistent with the exemplary embodiments. Thus, the disclosed embodiments are not intended to be limited to the embodiments shown, but is to be accorded the widest scope consistent with the principles and features described herein.

In general, power conversion systems for a power communications system are disclosed. A power conversion retrofit system is coupled to a power supply to supply input power over a power cable to remote radio heads (RRHs). The power boost retrofit system enables DC-DC converters to be retrofitted or installed in an existing power communications system in place of fiber optical modules. One or more DC voltage conversion (DCVC) modules containing DC-DC converters are inserted into respective slots in a front of an enclosure of the power conversion system. A connectivity and control (CC) module is inserted into a rear of the enclosure to mate with the DCVC modules and to connect with an opposite end of DC power cables.

Figure 1:
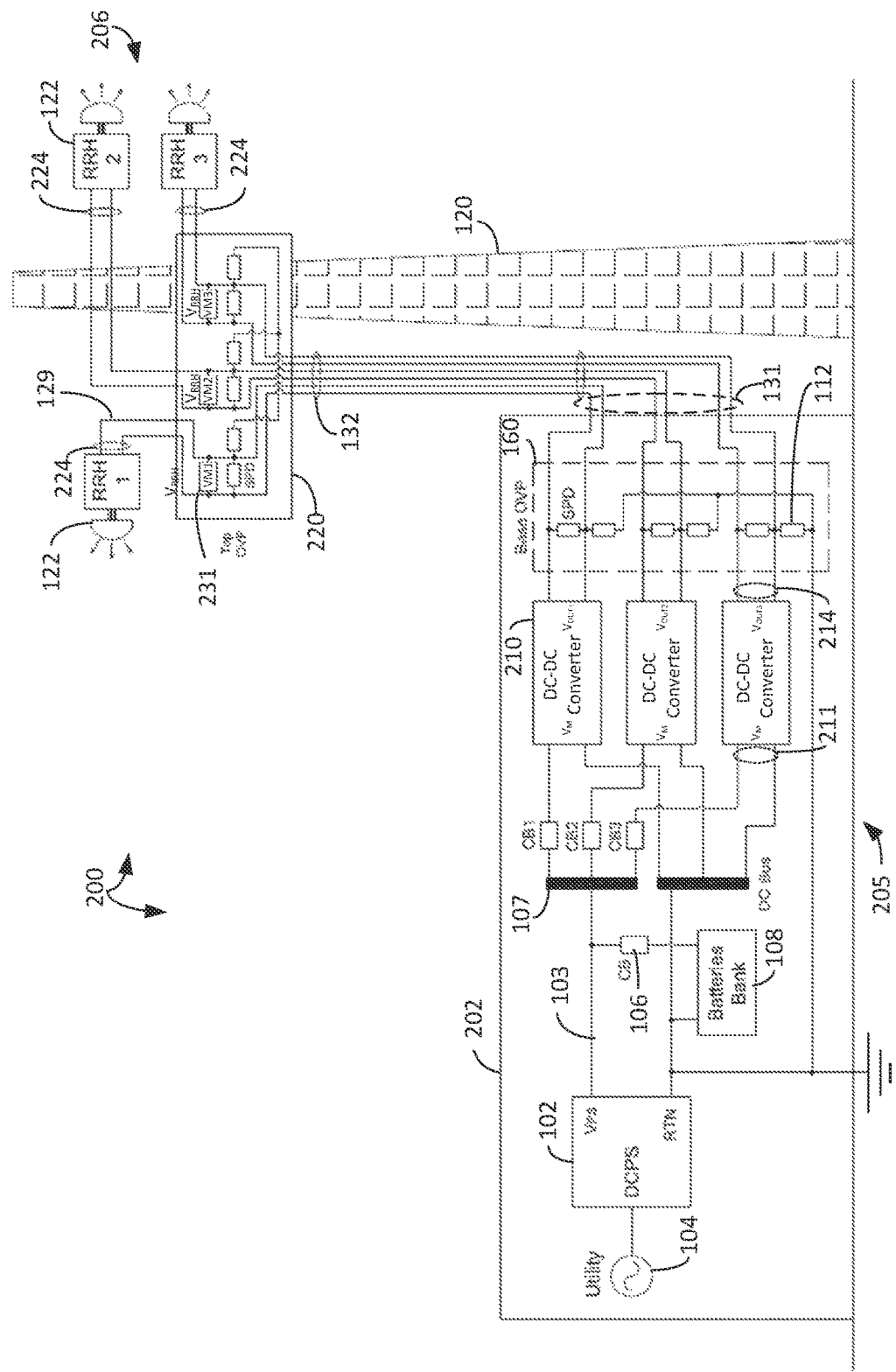
FIG. 1 shows an example power communication system used for powering remote radio heads (RRHs) 122 installed on the top of a structure such as a cellular radio tower.

To provide context, FIG. 1 shows a power communication system used for powering remote radio heads (RRHs) 122 installed on the top of a structure such as a cellular radio tower 120, as described in U.S. Ser. No. 10/812,664B2 (herein incorporated by reference). The same power transmission system also may be used for RRHs 122 located on other structures such as building rooftops. The description below refers to a base location 205 and a top location 206. Base location 205 refers to any location where a voltage control system 202 is located and connected to a base end of DC cable 132. In one example, base location 205 is at the base of cellular radio tower 120 or in a building that also contains a base band unit (BBU). Top location 206 is any location where RRHs 122 are located and connected to a second top end of DC power cables 132. In one example, top location 206 is on top of a cellular radio tower 120 or on a roof top.

The voltage control system 202 may include a DC power supply (DCPS) 102 that converts AC voltage from a power utility 104 into DC voltage. The DC output of DCPS 102 is connected to a DC bus 107. The same DC bus 107 also may be connected a battery bank 108 through a circuit breaker (CB) 106. CB 106 protects against short circuit conditions and a LVD (Low Voltage Disconnect) may be included in the circuit to disconnect battery bank 108 when the voltage drops below a certain voltage level, such as −42 Vdc.

Power from DC bus 107 is distributed to several DC circuits 131 (e.g., DCC1 to DCC3) that each feed a different RRH 122 through DC cable 132. In some cases, there might be more than 3 DC circuits, for example, there may be 12 DC circuits or even more. A base overvoltage protection (OPV) unit 160 protects voltage control system 100 from lightning events using multiple surge protective devices (SPD) 112. A top OVP unit 220 is located at the top of tower 120 protects RRHs 122 from lightning events. DC power jumper cables 129 connect terminals on the top OVP unit 220 for each DC circuit 131 to corresponding RRHs 122.

DCPS 102 is installed at the base of tower 120 and provides DC voltage 103 ($V_{PS}$) DCPS 102 converts the AC voltage from power utility 104 to a DC voltage 103 of between approximately −40 Vdc and −60 Vdc. DC voltage 103 is typically set between −52 Vdc and −55 Vdc. The exact output voltage 103 is selected based on specifications for optimum charging of batteries in battery bank 108 and type of batteries used, such as lead acid, NiCAD, etc. For some applications, the optimum operating/charging voltage of batteries 108 is around −53.5 Vdc.

The optimum operating voltage of RRHs 122 is around −54 Vdc. However, RRHs 122 have an operating voltage range from −40 Vdc (in some cases down to −36 Vdc) up to −59 Vdc and in some cases can operate at up to −60 Vdc. The operating voltage for RRHs 122 can also exceed −60 Vdc for limited time periods. RRH 122 shuts down and disconnects from the input power when the input voltage drops below −40 Vdc or rises above −60 Vdc for a certain period of time, such as for more than a few seconds.

In traditional systems, a voltage 224 at the input of RRH 122 ($V_{RRH}$) will be lower than DC voltage 103 output by DCPS 102. The difference between $V_{PS}$ and $V_{RRH}$ is equal to the voltage drop on DC power cable 132, breaker, and associated DC power jumper cables 129 that connect DCPS 102 with RRH 122. The voltage drop is dependent on the current conducted on DC power cable 132 and the associated resistance of DC power cable 132 (i.e. length and cross section).

One or more DC-DC converters 210 may scale up the output voltage from the voltage control system 202 based on an estimated resistance of DC power cable 132. The DC-DC converters 210 are coupled at inputs 211 ($V_{IN}$) to DC buses 107 (via breakers) and coupled at outputs 214 ($V_{OUT}$) to the base end of DC power cables 132. One or more voltage monitoring (VM) devices 231 are installed inside of top over voltage protection (OVP) units 220 and are coupled to the top end of DC power cables 132. One or more VM devices 231 are coupled the top end of DC power cables 132 as part of DC power jumper cables 129 that connect OVP 220 to RRHs 122.

VM devices 231 measure voltage 224 ($V_{RRH}$) at a top of the cellular radio tower 120 and communicate with CC module 504 (FIGS. 5A-5B) coupled to DC-DC converter 210 at base location 205. The VM devices 231 transmit the measured voltages to the CC module 504 through a communication link, such as a RS485 communication link. VM devices 231 may use other types of communication links, such as optical fiber lines. In another embodiment, the VM devices may send current pulses over DC power cables 132.

The CC module 504 may signal DC-DC converter 210 to add voltage levels to output voltage 214 so voltage 224 at top location 206 is stable at power input of the RRH, the RRH operating voltage range between −54 Vdc to −58 VDC. Therefore, the DC-DC converter 210 adjusts its output voltage to create a stable input voltage to the RRH. DC-DC converter 210 also keeps voltage 224 below a maximum operating voltage that could cause RRH 122 to shut down. Also, during start up, if the input voltage of the DC-DC converter is below a certain threshold (say −53 Vdc), then the output voltage of the DC-DC converter could be set to −53 Vdc to ensure proper startup of the RRH in case the system runs on batteries during the start up and the voltage level of the batteries is below −50 Vdc. Voltage 224 depends on the voltage drop on DC cable 132. The voltage drop depends on the length and cross section area of DC cable 132, and also depends on a conducted current through DC cable 132, which depends on the power consumption of RRH 122. The CC module 504 calculates the resistance of DC power cable 132, estimates the voltage drop on DC power cable 132, and signals the DC-DC converter to modify output voltage 214 to compensate for the Voltage drop.

Typically, the DC-DC converters 210 are installed with the other components of the base location 205 during construction. Currently, there is need for enabling the DC-DC converters 210 to be retrofitted or installed in an existing power transmission system.

Figure 2:
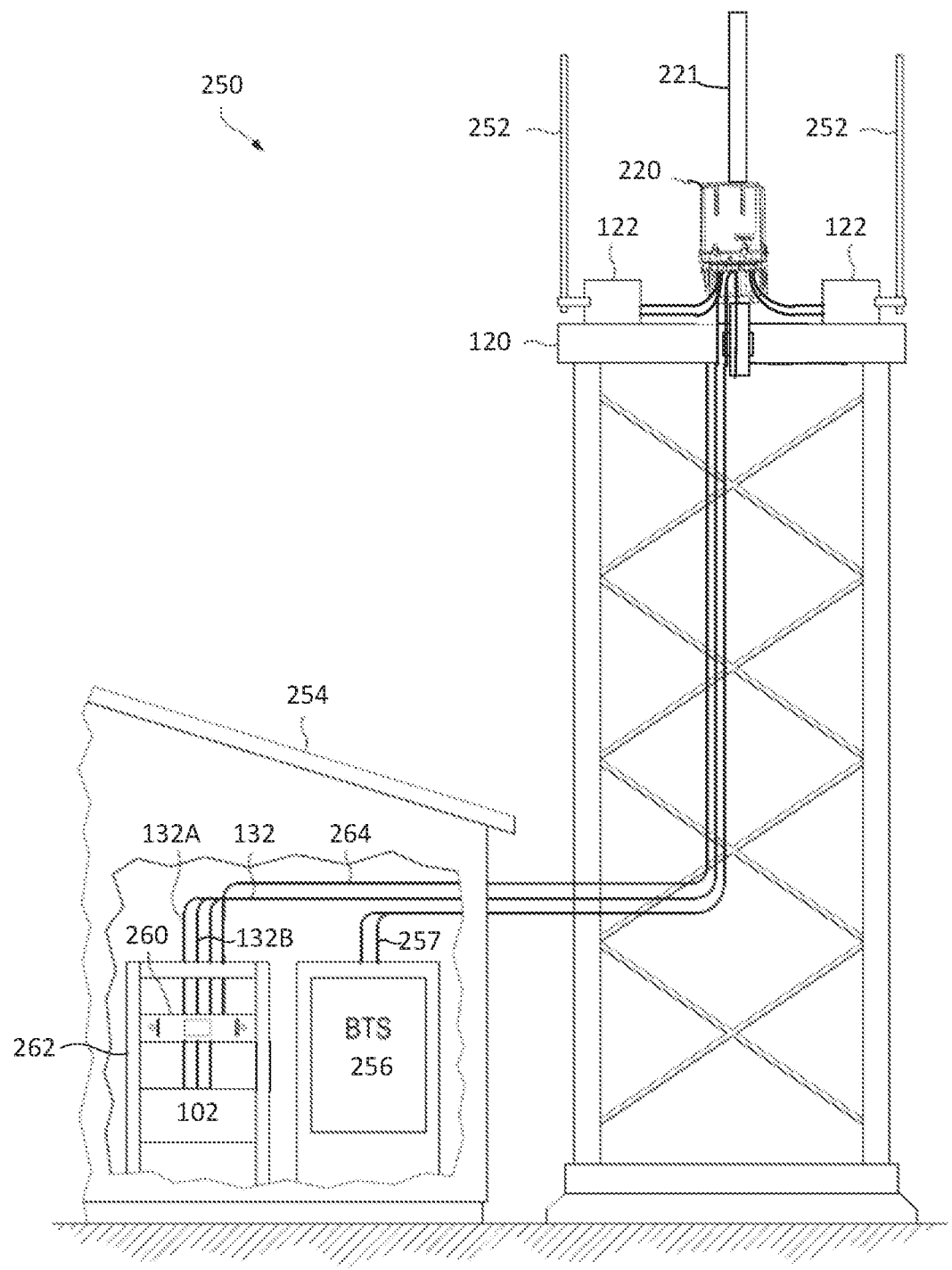
FIG. 2 shows an example power communications system that can be modified in the field with a power conversion retrofit system of the disclosed embodiments.

FIG. 2 shows an example power communications system that can be modified in the field with a power conversion retrofit system of the disclosed embodiments, where like components of FIG. 1 have like reference numerals. The power conversion retrofit system may comprise a base overvoltage protection unit 260 that plugs into rack 262 of existing power communication system 250 along with retrofitted DC-DC converters after installation. The power communications system 250 can also be referred to as a distributed antenna systems (DAS), distributed DC radio systems, remote radio heads (RRH), or a 4G or 5G or long term evolution (LTE) cellular communication systems, now commonly locate the radios next to the antennas on the tower outside of the communications shelter.

The power communications system 250 includes remote radio heads (RRHs) 122 next to antennas 252 on the tower adjacent to a communications building 254. The building 254 contains computing equipment for a base transceiver communication station (BTS) 256 that controls radio traffic and the RRHs 122 using fiber optic cables 257. The RRHs 122 are connected to associated antennas 252. The RRHs 122 are powered directly by DC feeds from Direct Current (DC) power supply (DCPS) 102, which is connected through a DC bus 107 (FIG. 1) and DC power cables 132 to the different RRHs 122 on cellular radio tower 120. In some cases, the DC power cables 132 and fiber optic cables 257 are run separately up the tower and in other cases they may be bundled together in one hybrid cable. In one example, DC power cables 132 may include sets of −48 DC volt power cables 132A, return power cables 132B, and associated ground cables (not shown) that extend out of building 254 and run up cellular radio tower 120 to different associated RRHs 122.

The power communications system 250 may further include surge protections by way one or more top overvoltage protection (OPV) units 220 and base overvoltage protection unit 260 housing surge protection devices (SPD) 112. Top OVP unit 220 is attached to a support 221 on top of cellular radio tower 120 and is connected to the remote ends of the DC power cables 132 proximate to RRHs 122 and antennas 252. In one example, the top OVP unit 220 is located within 2 meters of RRHs 122. The base overvoltage protection unit 260 is located inside of building 254 and is connected to the opposite local ends of DC power cables 132 relatively close to DCPS 102 and BTS 256. In one embodiment, base overvoltage protection unit 260 is located in a rack 262 that also contains DCPS 102. In another example, base overvoltage protection unit 260 is located in another rack or some other location next to DCPS 102.

A monitor cable 264 may connect monitoring circuitry in base overvoltage protection unit 260 to monitoring circuitry in top OVP unit 220. Monitoring circuitry may use monitor cable 264 to identify different alarm and voltage conditions in top OVP unit 220. For example, the monitoring circuitry may detect a failure of a surge protective device (SPD) within top OVP unit 220, detect intrusion into top OVP unit 220, detect water infiltration within top OVP unit 220, and/or detect remote voltage levels within top OVP unit 220.

In one example, RRHs 122 may be located outside of building 254, but relatively close to base overvoltage protection unit 260. For example, RRHs 122 may be located on the top of a building that also houses DCPS 102 and BTS 256. In this example, base overvoltage protection unit 260 still may be located in rack 262.

Base Overvoltage Protection (OVP) Unit

Figure 3:
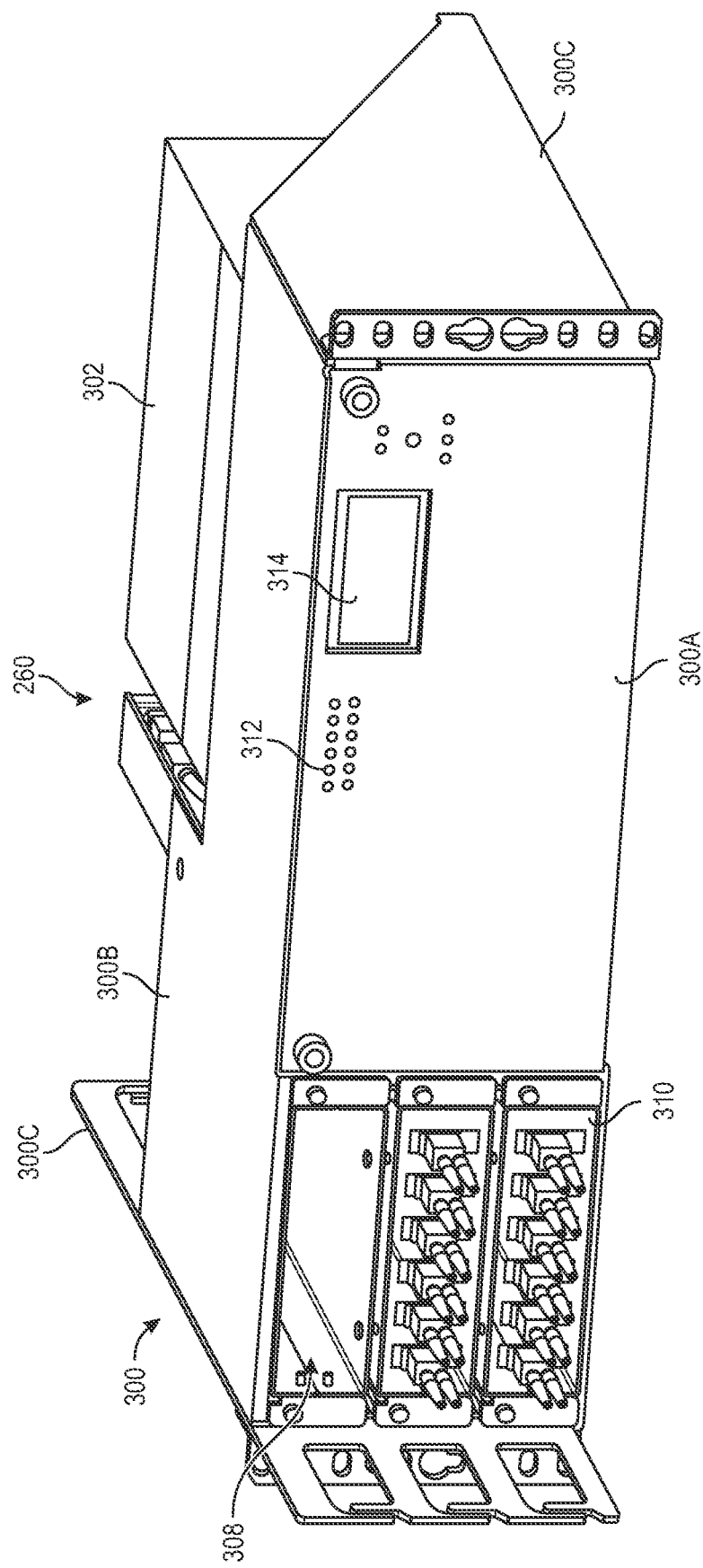
FIG. 3 shows a front perspective view of base overvoltage protection unit.

FIG. 3 shows a front perspective view of an existing base overvoltage protection unit 260. Base overvoltage protection (OVP) unit 260 includes an enclosure that inserts and attaches to rack 262 that also may support DCPS 102 (FIG. 2). Enclosure 300 includes a front face 300A, top and bottom walls 300B and side walls 300C. One side portion of enclosure 300 contains an overvoltage protection (OVP) assembly 302 that includes multiple surge protective devices (SPDs) 112. An opposite side portion of enclosure 300 originally contains multiple fiber optical modules 310 within slots 308 in enclosure 300.

A set of light emitting diodes (LEDs) 312 extend out of front face 300A and indicate the status of SPDs 110 in OVP assembly 302. A display 314 (e.g., an LCD) also extends out from front face 300A of enclosure 300 and identifies the voltage levels of DC power cables 132 at the top of cellular radio tower 120. A monitor board 216 (FIG. 4) in top OVP unit 220 may transmit measured voltages and other alarm conditions at the top of cellular radio tower 120 to base overvoltage protection unit 260. Base overvoltage protection unit 260 displays the measured voltages and alarms on display 314.

Base overvoltage protection unit 260 has may have a conventional Rack Unit (RU) form factor that in one embodiment is a 3 RU enclosure that can fit into a 19 inch or 23 inch rack configuration. This allows base overvoltage protection unit 260 to be mounted in the same rack 262 that holds the electronic circuitry for DCPS 102 and/or holds the telecommunication circuitry for the BTS 256 shown in FIGS. 1 and 2. This allows base overvoltage protection unit 260 to be connected closer to DCPS 102 and BTS 256. Base overvoltage protection unit 260 can be mounted onto any other rack or any other structure that may be housed in the building 254 shown in FIG. 2, uses minimal space, and does not require a special mounting structure or rack.

Figure 4A:
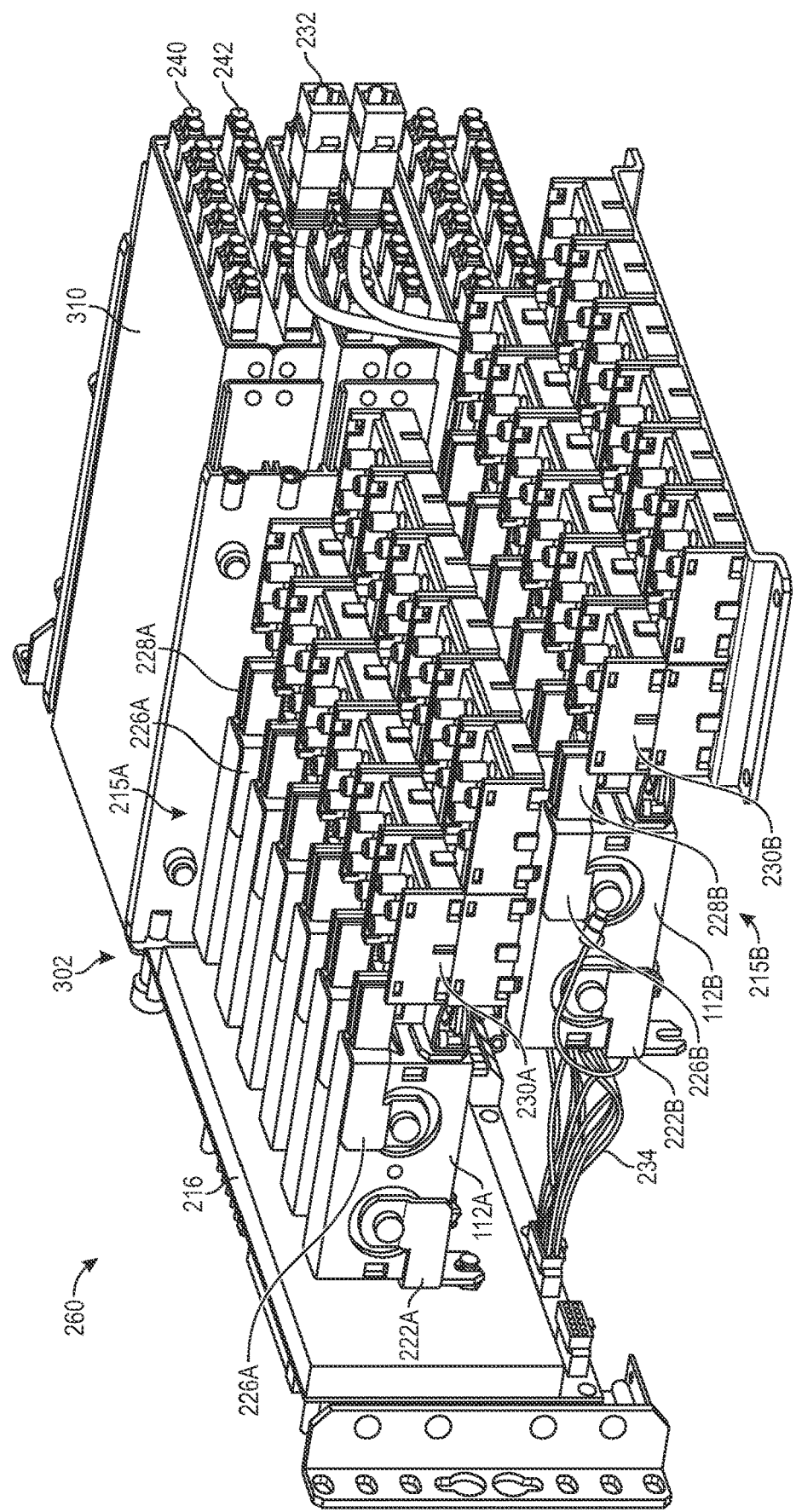
FIG. 4A depicts a rear view of base overvoltage protection unit with enclosure removed.

FIG. 4A depicts a rear view of base overvoltage protection unit 260 with enclosure 300 removed. Multiple SPDs 112 are aligned in two rows in the right section of base overvoltage protection unit 260. A first row 215A of six SPDs 112A are attached at font ends by bus bars 222A behind monitor board 216. Monitor board 216 is attached to a back of front face 300A and contains LEDs 312 and display 314 described above in FIG. 3. Back ends of SPDs 112A are attached by bus bars 226A and clips 228A to a first row of terminal assemblies 230A.

A second row 215B of six SPDs 112B are attached at front ends by bus bars 222B to a bracket (not shown) that extends vertically up from the bottom wall of enclosure 300. Back ends of SPDs 112B are attached by bus bars 226B and clips 228B to a second rows of terminal assemblies 230B.

Cables 232 connect to local ends of monitor cables 264 (FIG. 2) (e.g., RS485 monitor cables) that connect on second remote ends to another monitor board (not shown) in top OVP unit 220. Monitor wires 234 are connected to each SPDs 110. Monitor wires 234 are connected to local ends of −48 V power cables 132A and local ends of return power cables 132B (FIG. 2). Monitor wires 234 connect to monitor board 216 and connect to LEDs 312 in FIG. 5A to identify the condition of the SPDs 110.

In one example, three existing fiber optical modules 310 (e.g., common public radio interface (CPRI) modules) may be mounted in trays that slide in and out of the slots 308 of enclosure 300. A first set of upper interconnection ports 240 are coupled to uplink and downlink fibers that attach to RRHs 122 on the top of cellular radio tower 120. A second set of interconnection ports 242 are coupled to uplink and downlink fibers that attach to a base band unit (BBU) located in BTS 256 of FIG. 2.

Figure 4B:
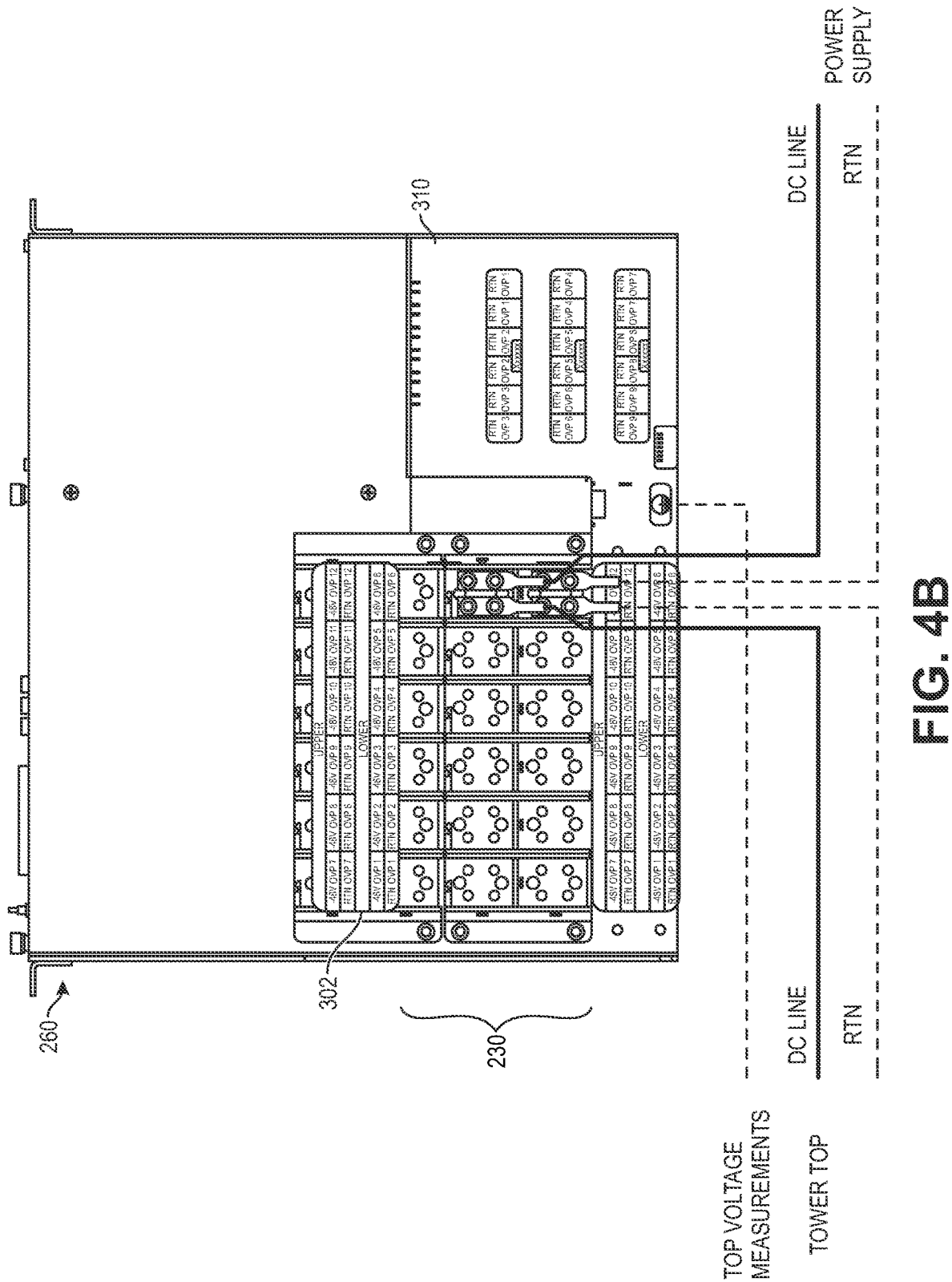
FIG. 4B illustrates an example cable connections to the terminal assemblies prior to installation of the power conversion retrofit system.

FIG. 4B illustrates an example cable connections to the terminal assemblies 230 prior to installation of the power boost retrofit system 500.

Referring again to FIG. 3, according to the disclosed embodiments, empty slots 308 in base overvoltage protection unit 260 originally designed to contain fiber optical modules 310 are repurposed and used to retain one or more power conversion retrofit systems that contain DC-DC converters 210. Any existing fiber optical modules 310 in slots 308 are removed and replaced in the field with power conversion retrofit systems, enabling the DC-DC converters 210 to be retrofitted in an existing power communications system.

Figure 5A:
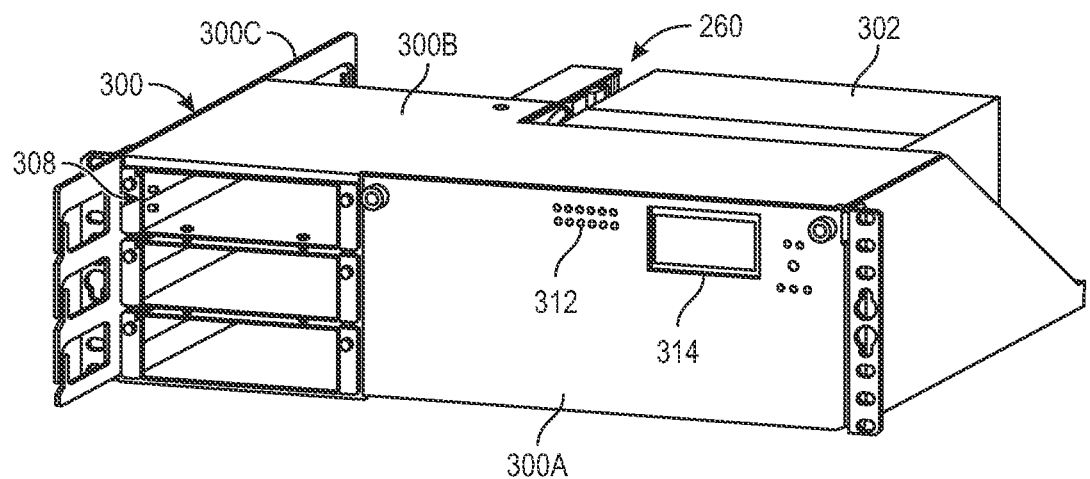
FIG. 5A is a diagram illustrating an example power conversion retrofit system that enables DC-DC converters to be retrofitted or installed in an existing power communications system to compensate for the voltage drop from the voltage control system on cables.
Figure 5A:
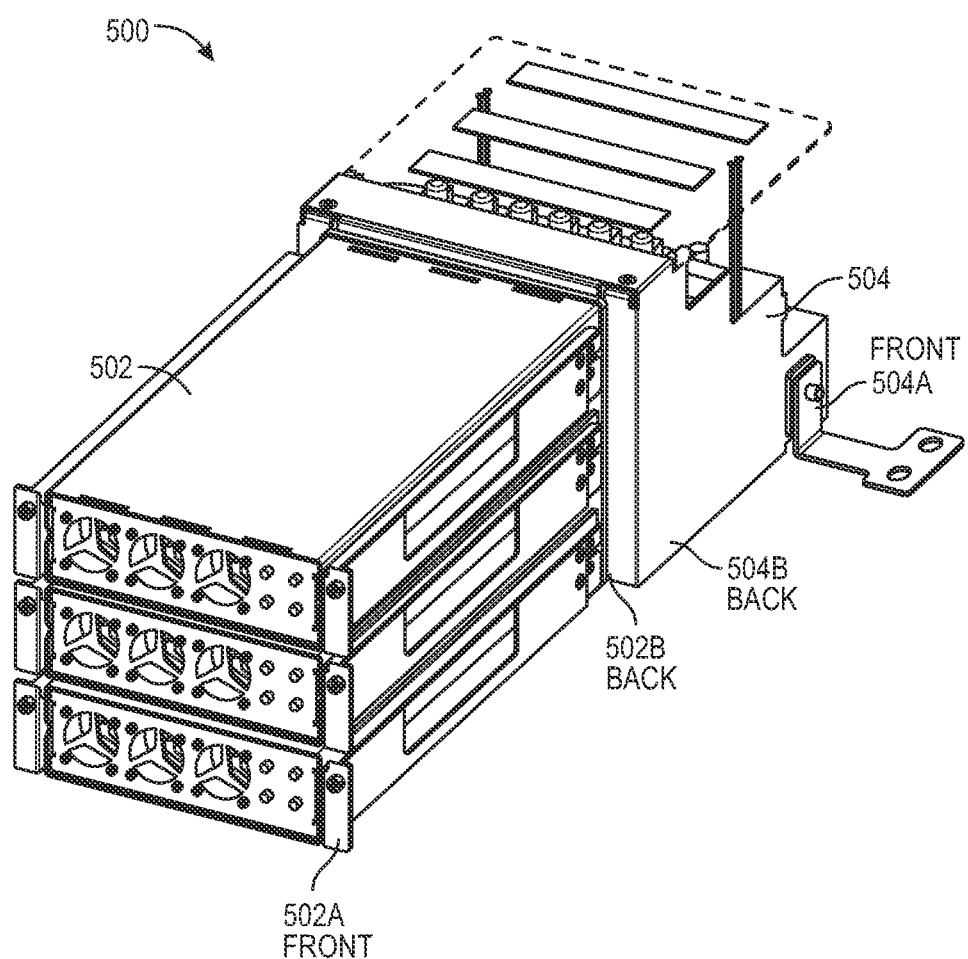

FIG. 5A is a diagram illustrating an example power conversion retrofit system 500 that enables DC-DC converters to be retrofitted or installed in an existing power communications system. The power conversion retrofit system 500 is designed for integration with the existing base overvoltage protection unit 260, which is mounted in rack 262 (e.g., a 12 circuit rack) within building 254, in place of fiber optical modules 310. In one embodiment, the output of the DC-DC converters is fixed at an elevated voltage compared to the input voltage. In one embodiment, the output of the DC-DC converters may be dynamic to compensate for the changing voltage drop on the DC cables as current demand from the RRHs 122 varies.

The power conversion retrofit system 500 comprises one or more pluggable DC voltage conversion (DCVC) modules 502 containing one to three DC-DC converters 210 (FIG. 1), and a rear connectivity and control (CC) module 504. The DCVC modules 502 are inserted into the front of respective slots 308 in the front of the enclosure 300 of the base overvoltage protection unit 260 that were originally designed to contain fiber optical modules 310. The CC module 504 comprises a single unit that is inserted into a rear of slots 308 in back of the enclosure 300 to mate with the DCVC modules 502 and to connect to the DC power cables 132. In other embodiment, the CC module 504 may comprises more than one unit.

During operation in an optional embodiment, the CC module 504 may monitor an input voltage on the DC power cables at the RRHs and adjust an output voltage of the DC-DC converters 210 to compensate for a voltage drop on the DC power cables 132. The power conversion retrofit system 500 is compatible with power communications systems having either a changing voltage drop or a fixed voltage drop. The output voltage of power conversion retrofit system 500 can be configured to ensure the input or targeted voltage (Vt) at the RRH 122 is at a preselected value. The targeted RRH voltage (Vt) can be in the range −54 Vdc to −58 Vdc (the upper limit could be extended to −60 Vdc or above, if needed).

The power conversion retrofit system 500 receives a measurement of the voltage reaching the RRH 122 from a volt-meter circuit incorporated in the voltage monitoring (VM) devices 231 installed inside of top OVP units 220 (FIG. 2). From this information, the voltage drop on the DC power cables 132 is determined and power conversion retrofit system 500 then adjusts its output voltage to compensate. The voltage measurement eliminates the need to know the conductor length or gauge to compensate the voltage. During operation, the output voltage of the power conversion retrofit system 500, and therefore the output voltage of the base overvoltage protection unit 260, dynamically adjusts to keep the input voltage of the RRH constant during variations in the RRH's power demand. In another implementation, the voltage measurements at the input of the RRH can be used to determine the resistance of the cable by measuring or estimating the output current. Then the output voltage of the power conversion retrofit system can be adjusted based on the measurements or estimated values of the output current and the use of the cable resistance. The cable resistance can be adjusted during operation by comparing the projected voltage at the RRH input with the voltage measurements at the RRH input from the VM devices 231. In another implementation, the resistance of the power cable may be provided by the user in terms of length and cross section of the DC power cable.

The power conversion retrofit system 500 provides a maximum output current of 50 A, while the #6 AWG conductor often adopted as the DC trunk in telecom installations, has a maximum capacity typical limited to 30 A (with derating factors applied). To protect such conductors, power conversion retrofit system 500 incorporates a provision to set its maximum output current. If this is exceeded, the units will enter a current limiting mode thereby protecting the conductor.

In one example embodiment, the power conversion retrofit system 500 may be configured with the following specifications and configurable parameters/settings. The DC specifications may include:

Input voltage: −39 Vdc to −58 Vdc
Output voltage: −54 Vdc (@−54 Vdc input voltage) up to −74 Vdc (@−50 Vdc input voltage)
Output current (Iout): 0 to 50 A
Efficiency: 98.2%

The configurable parameters may include:
Targeted RRH voltage (Vt): −54 Vdc to −60 Vdc
Maximum output current (Imax): 20 A to 50 A.

As shown, the DCVC modules 502 and the CC module 504 have respective front sides 502A and 504A, and back sides 502B and 504B. The DCVC modules 502 are inserted into the slots 308 in the enclosure 300 such that the front side 502A is at least coplanar or extends past the front face 300A of the enclosure 300, and the back side 502B is located inside enclosure 300. Similarly, the CC module 504 is inserted into the rear of the enclosure 300 along sidewall 300C so that the front side 504A is coplanar or extends past a back of the enclosure 300, and the back side 502B is located inside enclosure 300 to mate with the DCVC modules 502 via connectors located in the back sides 502B and 504B of both of the DCVC modules 502 and the CC module 504.

In one example embodiment, three DCVC modules 502 are inserted into the front of three slots 308 in the front of the enclosure 300 of the base overvoltage protection unit 260. In other embodiments, there may be a different number of DCVC modules 502 and a corresponding number of slots 308 in the enclosure 300. Also, there may be more empty slots 308 than the number of DCVC modules 502 installed.

In one embodiment, each DCVC module 502 may support three RRHs 122, depending on the number of DCVC module 502 installed. Thus, the modular design may convert the voltage for 3, 6 or 9 RRHs. In another embodiment, each DCVC module 502 may support four RRHs 122 to convert the voltage for 4, 8 or 12 RRHs.

Figures 1, 5B:
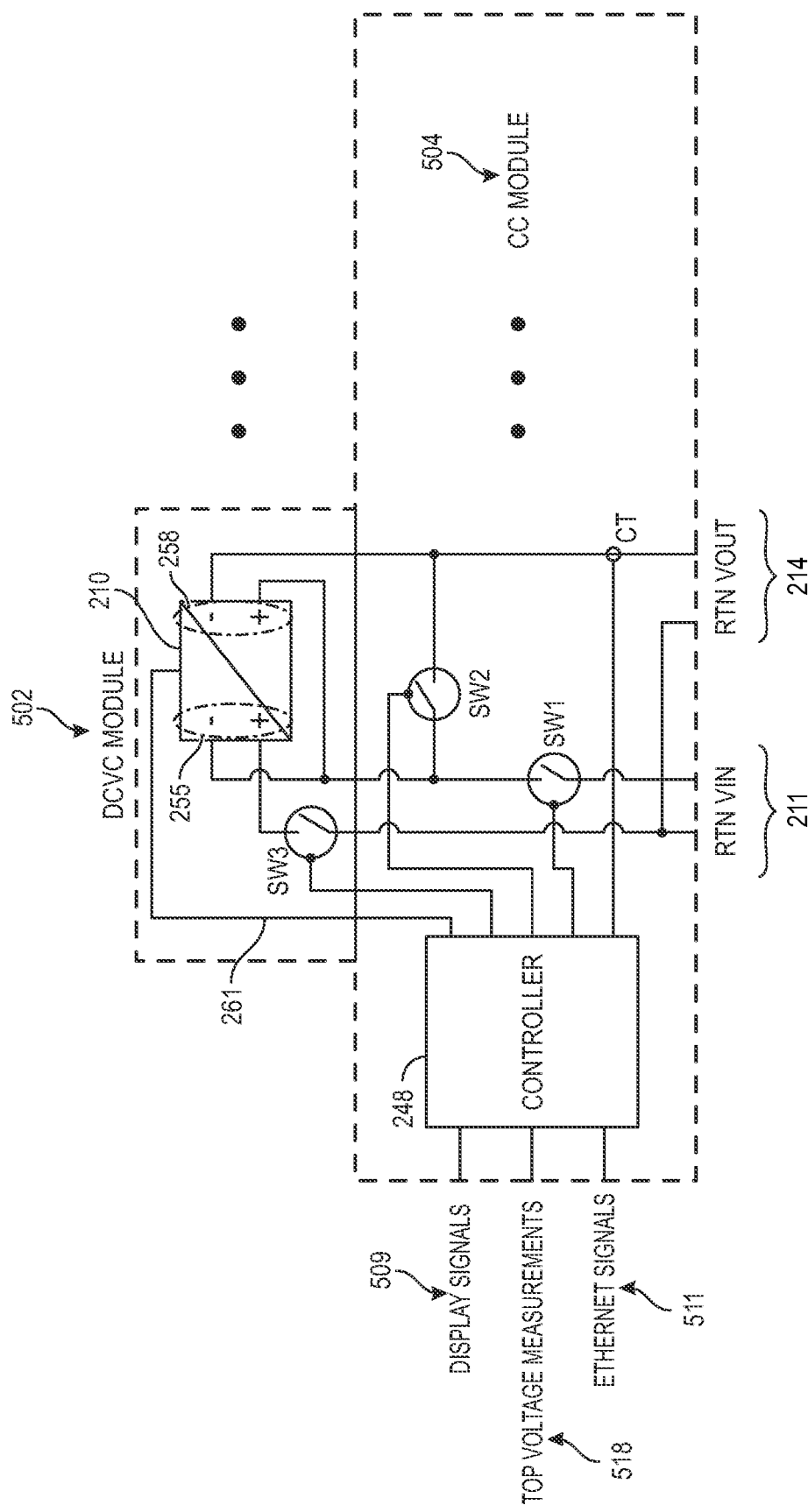
Figures 2, 5B:
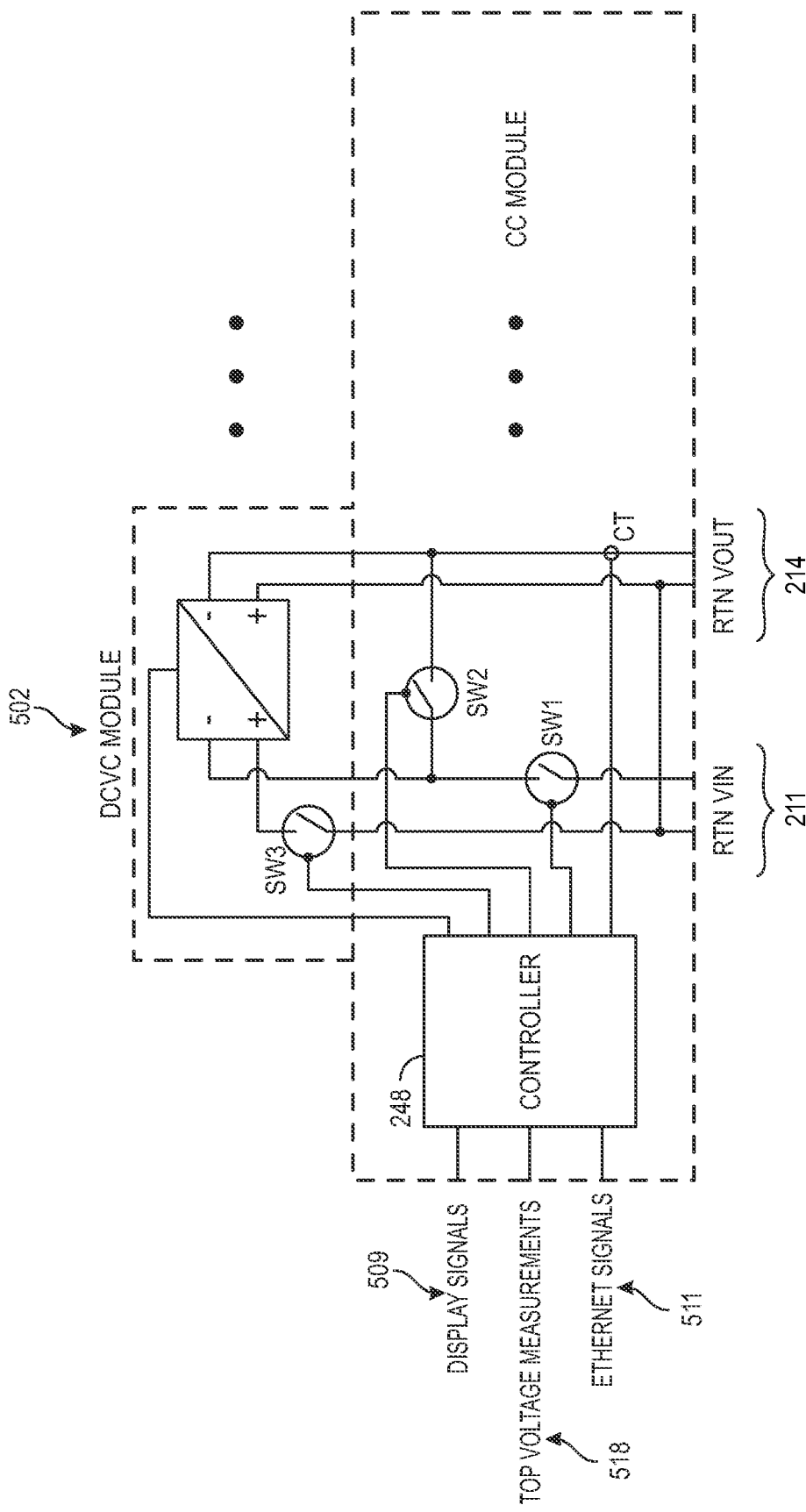

FIG. 5B-1 is a simplified block diagram showing connections of the DCVC module 502 and the CC module 504 of the power conversion retrofit system when installed in the base OVP unit 260. Although only one DCVC module 502 and DC-DC converter 210 are shown as an example, it is to be appreciated that the CC module 504 may be connected to more than one DCVC module 502 having multiple DC-DC converters 210, each may be independent from the others. The output voltage of the DCVC module 502 is the input voltage plus an output voltage of the DC-DC converter 210. The output voltage of DC-DC converter 210 could be between 0-24 Vdc. Thus, in this embodiment the DCVC does not convert the full power of the input power, only a fraction of the input power.

The CC module 504 includes an input 211 that receives input power on DC bus 107 from DCPS 102 (FIG. 1). The input power includes input voltage ($V_{IN}$) that varies from approximately –39 Vdc up to –58 Vdc. The input power is passed to the DC-DC converter 210 via voltage input 255. The DC-DC converter 210 generates an output voltage 258 that is a fixed or variable, which is passed through the CC module 504 as output voltage 214 ($V_{OUT}$) to the top OVP unit 220. For example, the DC-DC converter 210 may generate output voltages 258 of –54 VDC up to –74 Vdc.

The CC module 504 includes a controller 248 that receives top voltage measurements 518 from the top OVP unit 220, and selectivity activates the DCVC module 502 to adjust output voltage 258 to compensate for the voltage drop. The CC module 504 adjusts the output voltage 258 of the DC-DC converter 210 by sending voltage control signal 261 to DC-DC converter 210. The CC module 504 first reads the top voltage measurements 518 and based on output current measurements taken with CT located inside CC module 504 and the output voltage 258 of the DC-DC converter 210 at the base, calculates the resistance of each DC circuit 131. This resistance can also be updated during the operation of the system in case the resistance changed. During operation, the CC module 504 continually estimates the voltage drop on the DC cable for each DC circuit 131, through the output current measurement at base (CT) and the resistance of the circuit. Then, the CC module 504 determines what should be the output voltage 258 of each DC-DC converter 210 in order to compensate the voltage drop on the DC cable for each DC circuit 131, and then provides this information to the DC-DC converter 210 to adjust its output voltage accordingly.

The CC module 504 may continue power supply to the RRHs 122 in case the DC-DC converter 210 fails or is unplugged, causing the system to operate in by-pass mode for each DC circuit 131 independently, where input voltage 211 is transferred to the output voltage 214. Each of the DCVC modules 502 can be plugged or unplugged when the system is in operation without disconnecting the power transmission to the RRHs 122. Coupled to the controller 248 are three switches, SW1, SW2 and SW3, for each DC circuit 131 that transfer the input voltage to the output voltage. SW2 by-passes the DC-DC converter 210 in case the DC-DC converter 210 has failed or the DCVC module 502 is unplugged. The CC module 504 may have a current limit function. When the output voltage exceeds a certain threshold for a period of time, the CC module 504 uses SW1 to disconnect the input voltage from the power supply for each DC circuit 131, and then uses SW2 to connect the input voltage to the output to maintain power to the RRH. The CC module 504 may also have protection against reverse polarity, so when the input voltage is connected in reverse polarity, SW1 and SW3 are used to disconnect the system. SW1 interrupts the input voltage 211 in case of overcurrent conditions at the output. In the FIG. 5B-1 embodiment, the DC-DC converters 210 of the DCVC module 502 convert a portion of the input power to a configured voltage level. The output voltage is the input voltage plus an output voltage of the DC-DC converters 210. Thus, the power conversion retrofit system 500 does not convert the full power of the input power, only a fraction of the input power.

FIG. 5B-2 is a block diagram showing connections of the DCVC module 502 and the CC module 504 of the power conversion retrofit system in an implementation where the DCVC module 502 is a full-scale converter system. In a full-scale converter system the DC-DC converters 210 convert all of the input power to the output voltage of the power conversion retrofit system 500 but at a different voltage level. Switch SW1 is used to disconnect input power in cases of overcurrent conditions. SW2 is used to by-pass the converter. SW1 and SW3 are used to disconnect the DC-DC converter in case of reverse polarity. Finally, the power conversion retrofit system could also be implemented as an isolated full-scale DC-DC converter when the RTN at input is NOT connected to the RTN at output in the CC MODULE. In some other embodiments, switches SW3 and/or SW2 might not be used.

In both FIGS. 5B-1 and 5B-2, the CC module 504 is used for connectivity of the power input and output conductors. The controller 248 may be implemented either in the CC module 504 or inside the DCVC modules 502.

The CC module 504 may communicate to a user through the display 314 (FIG. 3) using display signals 509 that provide/display information on settings and status and the alarms of the system and to receive settings information. Settings may include a target top voltage for each DC circuit, current limit thresholds, and the like.

Another function of the CC module 504 is to monitor the status and the alarms of the system and then communicate alarm and status information to the operator. This may be accomplished through Ethernet signals 511 (using SNMP protocols) that transfers data to an external device/location. There is also a web interface that can be used through an Ethernet (LAN) to enable the user to see/modify the settings of the system and also observe the parameters (current, voltage T etc). The CC module 504 may also have bootloader functionality that that enables firmware updates of the system through the Ethernet connection. Information about the bootloader connectivity and the SNMP protocol connectivity settings may also be displayed on display 314.

Figure 5C:
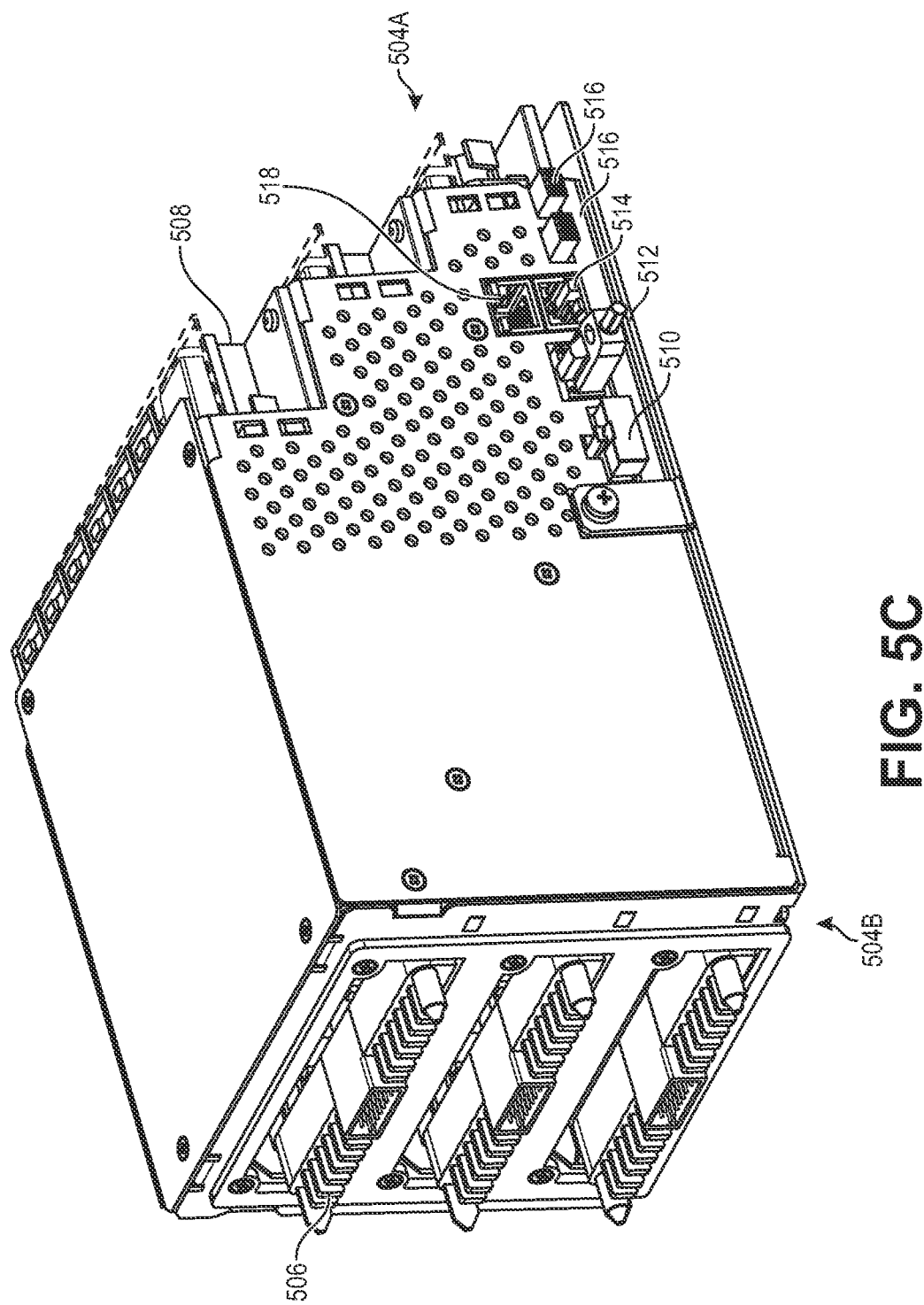
FIG. 5C is a diagram illustrating an angled rear view of the CC module of the power conversion retrofit system.
Figure 5D:
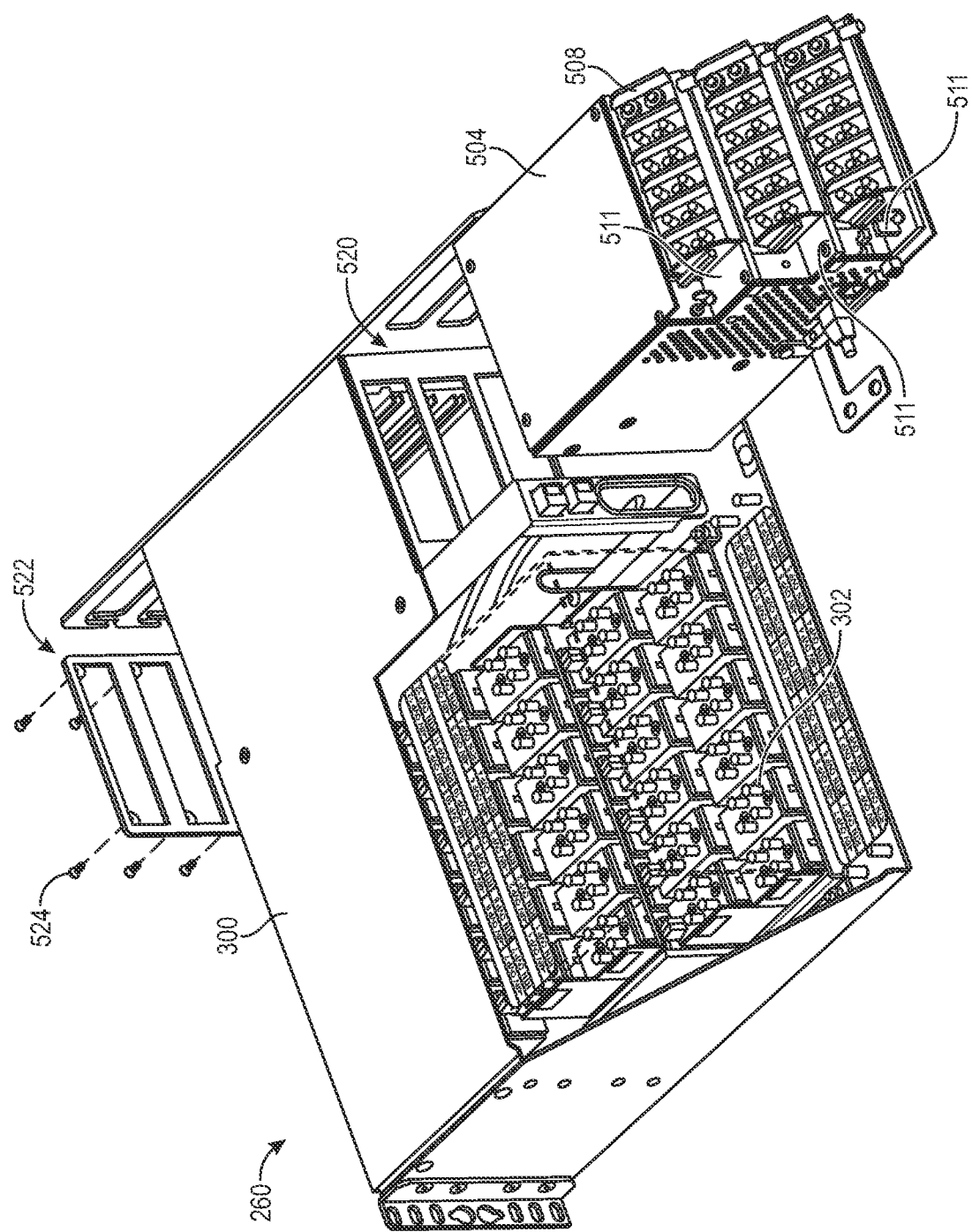
FIG. 5D is a diagram illustrating an angled rear, exploded view of the base overvoltage protection unit and the CC module.

FIG. 5C is a diagram illustrating an angled rear view of the CC module 504 of the power conversion retrofit system. The back side 504B OF CC module 504 includes rear connectors 506 that connect to mating connectors on the back side 502B of the DCVC module 502. The front side 504A of the CC module includes stacked power terminals 508 (FIG. 5D). A side wall of the CC module 504 may include any of a display connector 510, an Ethernet connector 512, a cable input 514 to the monitor cables 264 from the top OVP unit 220, RCA alarm connectors 516 (major and critical), and an output for top voltage measurements 518 (daisy chain) to connect to a second power conversion system that needs to read top voltage measurements from this string.

FIG. 5D is a diagram illustrating an angled rear, exploded view of the base overvoltage protection unit 260 and the CC module 504. This views shows OVP assembly 302 housed within back of the enclosure 300 of the base overvoltage protection unit 260. The CC module 504 is shown partially inserted in back of an opening 520 of the enclosure 300 that was originally designed to house rear of fiber optical modules 310. In one embodiment, a separation wall 522 may be installed in the opening 520 beneath a rear edge of top wall 300B of the enclosure 300 to secure the CC module 504 in place. The separation wall 522 includes slots therein matching the slots 308 in front face 300A of the enclosure 300 to allow connectors on back of the DCVC modules 502 to mate with rear connectors 506 on the CC module 504. The separation wall 522 is shown being inserted to the front of the opening 520 to the location beneath the rear edge of top wall 300B, and then attached to an internal frame of the enclosure 300 with a set of screws 524. The backside 504B of CC module 504 is then attached to the separation wall 522 and secured in place.

FIG. 5D also shows that the front face 504A of the CC module 504 includes multiple stacked and horizontally offset printed circuit boards (PCBs) 511. The PCBs 511 include output terminals that connect to boosted output conductors (DC line and RTN) that are output from the CC module 504, as shown in FIG. 7C. Boosted output conductors (e.g., A1, A2, and A3) coupled to one of the DCVC modules 502 extend out of the top PCB 511, boosted output conductors (e.g., B1, B2, B3) coupled to a second one of the DCVC modules 502 extend out of the middle PCB 511, and boosted output conductors (e.g., C1, C2, and C3) coupled to a third one of the DCVC modules 502 extend out of the bottom PCB 511.

Figure 5E:
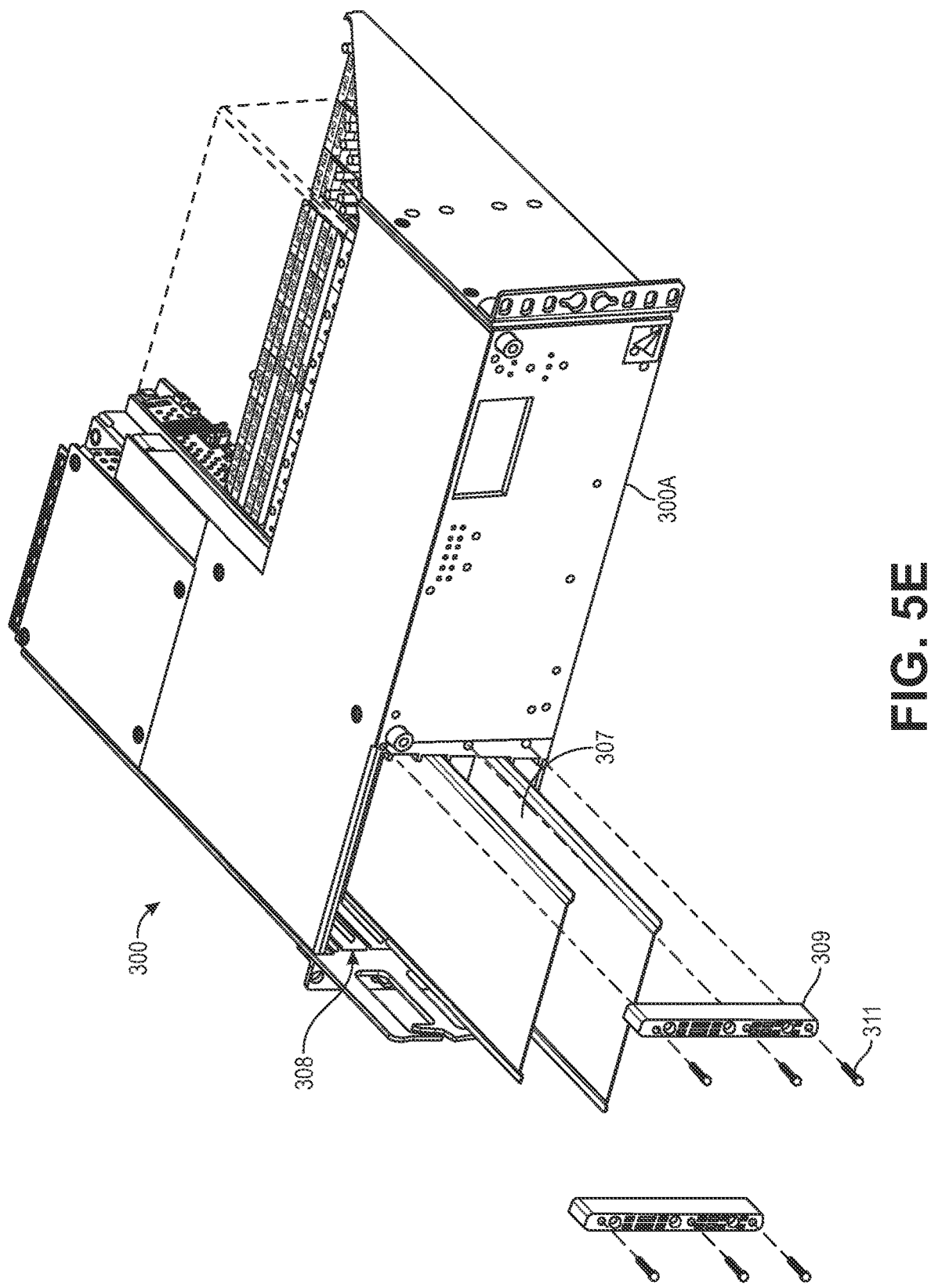
FIG. 5E is a diagram illustrating of the front of the enclosure showing that separation trays may be optionally installed horizontally at a base of one or more of the slots to aid in installation of the DCVC modules.

FIG. 5E is a diagram illustrating of the front of the enclosure 300 showing that separation trays 307 may be optionally installed horizontally at a base of one or more of the slots 308 to aid in installation of the DCVC modules 502. A set of stand-off brackets 309 may be installed on opposite sides of the slots 308 to affix the DCVC modules 502 with a set of screws 311.

Figure 5F:
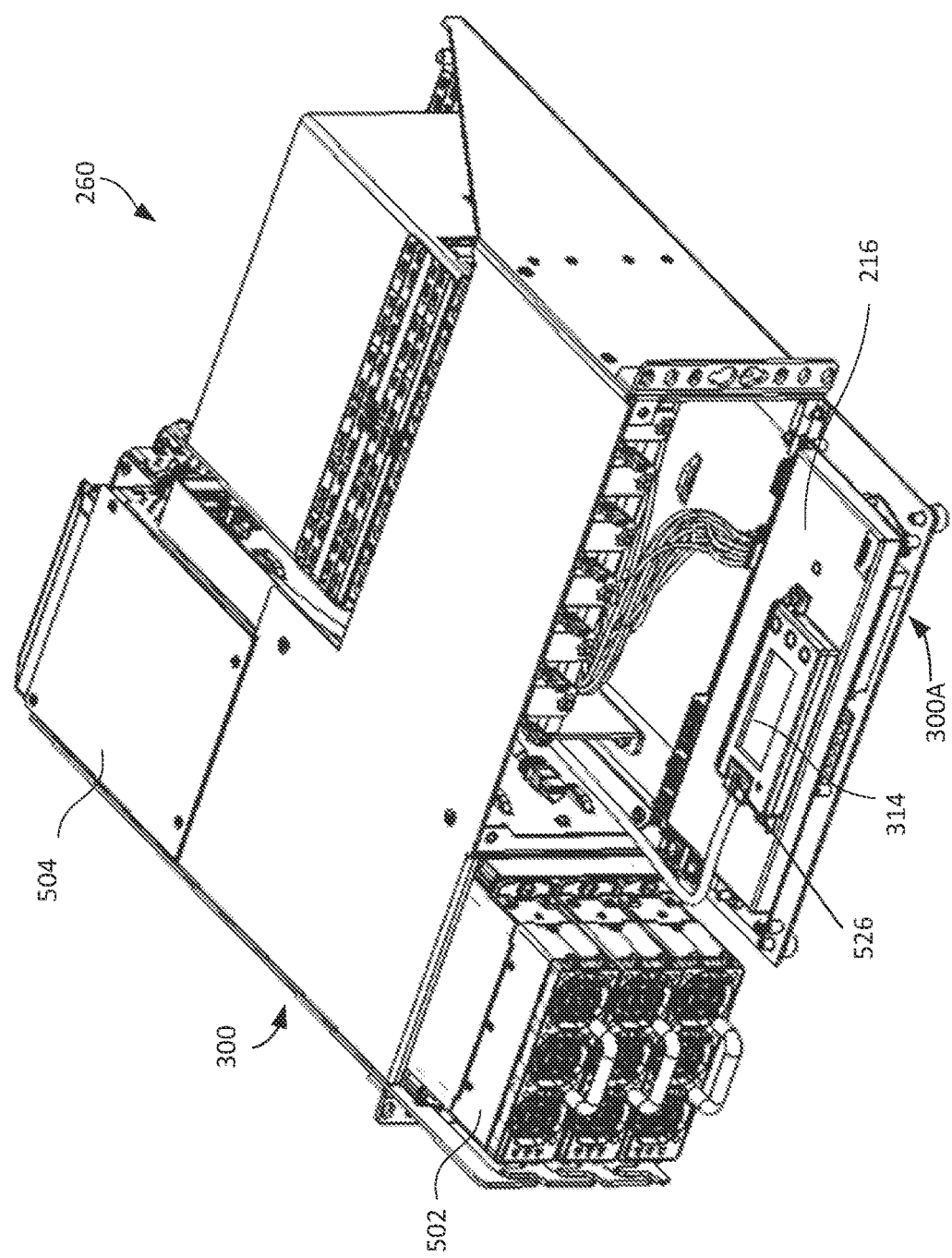
FIG. 5F is a diagram illustrating a view of the DCVC modules and CC module of the power conversion retrofit system installed inside the enclosure of the base overvoltage protection unit.

FIG. 5F is a diagram illustrating a view of the DCVC modules 502 and CC module 504 of the power conversion retrofit system installed inside the enclosure 300 of the base overvoltage protection unit 260. In a further embodiment, the back of the front face 300A of enclosure 300 may include monitor board 216 (FIG. 4A) with display 314 to allow access to the power conversion retrofit system 500, while preserving existing OVP board features. The monitor board 216 may be the same or different from in the base overvoltage protection unit 260 and may house the same display 314 or use a different display. The display 314 is to enable a user to configure settings of the system and provide visual information. A cable (not shown) may be inserted between connector 526 and display connector 510 (FIG. 5C) on the CC module 504 so the CC module 504 can send data to display and to receive settings from the user.

The power conversion retrofit system 500 repurposes and reuses the slots 308 in the base overvoltage protection unit 260 to retain respective DCVC modules 502. Thus, a user can remove any existing fiber optical modules 310 in slots 308 and replace them in the field with DCVC modules 502 containing DC-DC converters 210. This enables the DC-DC converters 210 to be retrofitted in an existing power communications system 250 to compensate for the voltage drop on the DC power cables 132.

Figure 6:
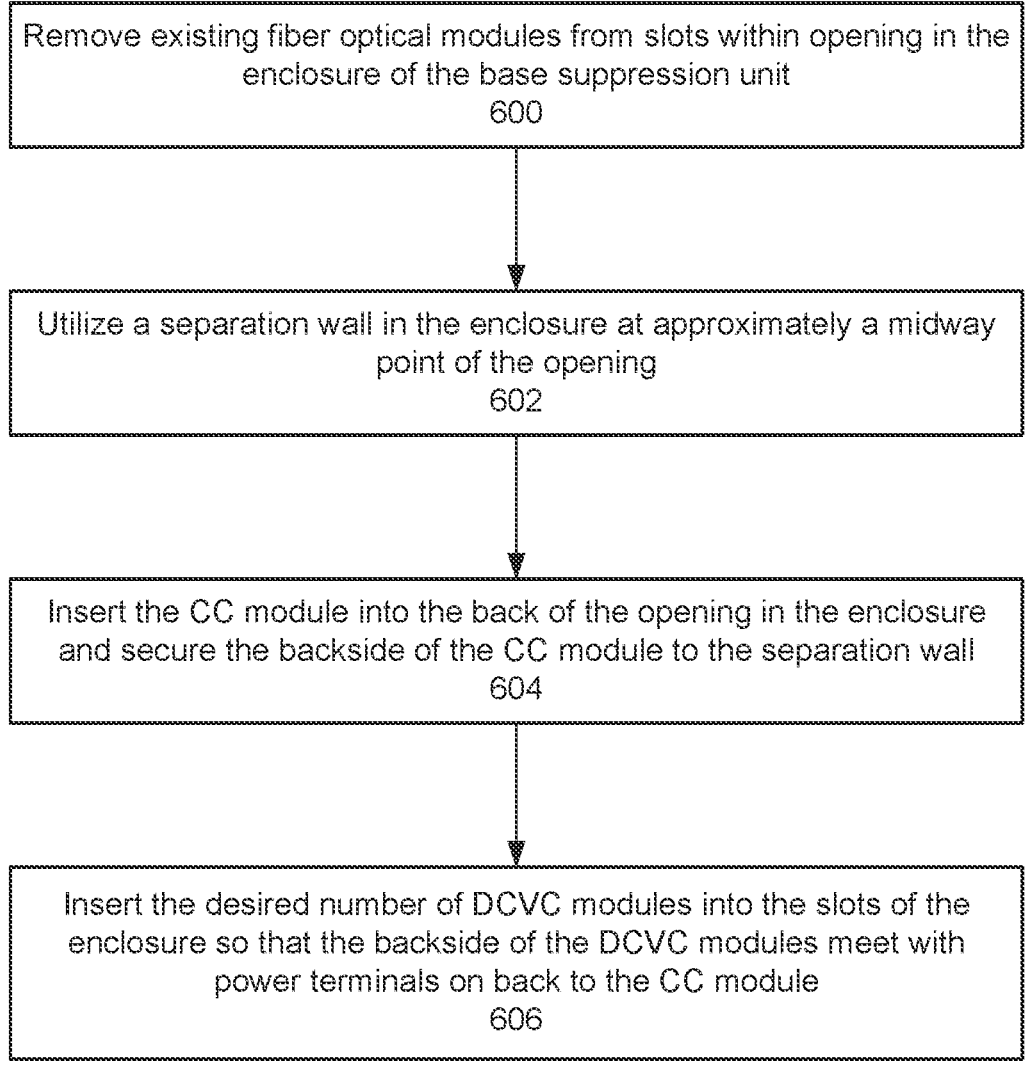
FIG. 6 illustrates a flow diagram of a process for mechanically installing the power conversion retrofit system including the DCVC modules and CC module in the base overvoltage protection unit.

FIG. 6 illustrates a flow diagram of a process for mechanically installing the power conversion retrofit system 500 including the DCVC modules 502 and CC module 504 in the base overvoltage protection unit 260. The process may begin by a user removing any existing fiber optical modules 310 (e.g., CPRI modules) that may be mounted in the slots 308 within an opening 520 in the enclosure 300 of the base overvoltage protection unit 260 (block 600). Alternatively, if there are no fiber optical modules 310 in slots 308, the user may need to remove cover plates that may be attached over the slots 308.

A separation wall 522 is utilized in the enclosure 300 at approximately a midpoint of the opening 520 to secure the CC module 504 in place (block 602). In one embodiment, the midpoint of the opening 520 may align with a rear edge of top wall 300B of the enclosure 300 (FIG. 5D). The separation wall 522 may be installed in the enclosure 300 by attaching the separation wall 522 to an internal frame of the enclosure 300 with screws.

The CC module 504 is then inserted into the back of the opening 520 in enclosure 300 and secured the backside 504B of the CC module 504 to the separation wall 522 (block 604). This step may also include making desired connections to the CC module 504, such as connecting a cable inside enclosure 300 between the display connector 510 (FIG. 5F) to the connector 526 on back of monitor board 216 (FIG. 5F), and plugging in an Internet cable into the Ethernet connector 512 and the like.

A desired number of DCVC modules 502 is then inserted into respective slots 308 of the enclosure 300 so that the backside 502B of the DCVC modules 502 mate with the power terminals 508 on back of the CC module 504 (block 606). In one embodiment, this step may include optionally installing separation trays in slots 308 that hold the DCVC modules 502 and installing stand-off brackets 509 on opposite sides of the slots 308 to affix the front plates of the DCVC modules 502 to the stand-off brackets 509 with retaining screws.

Figure 7A:
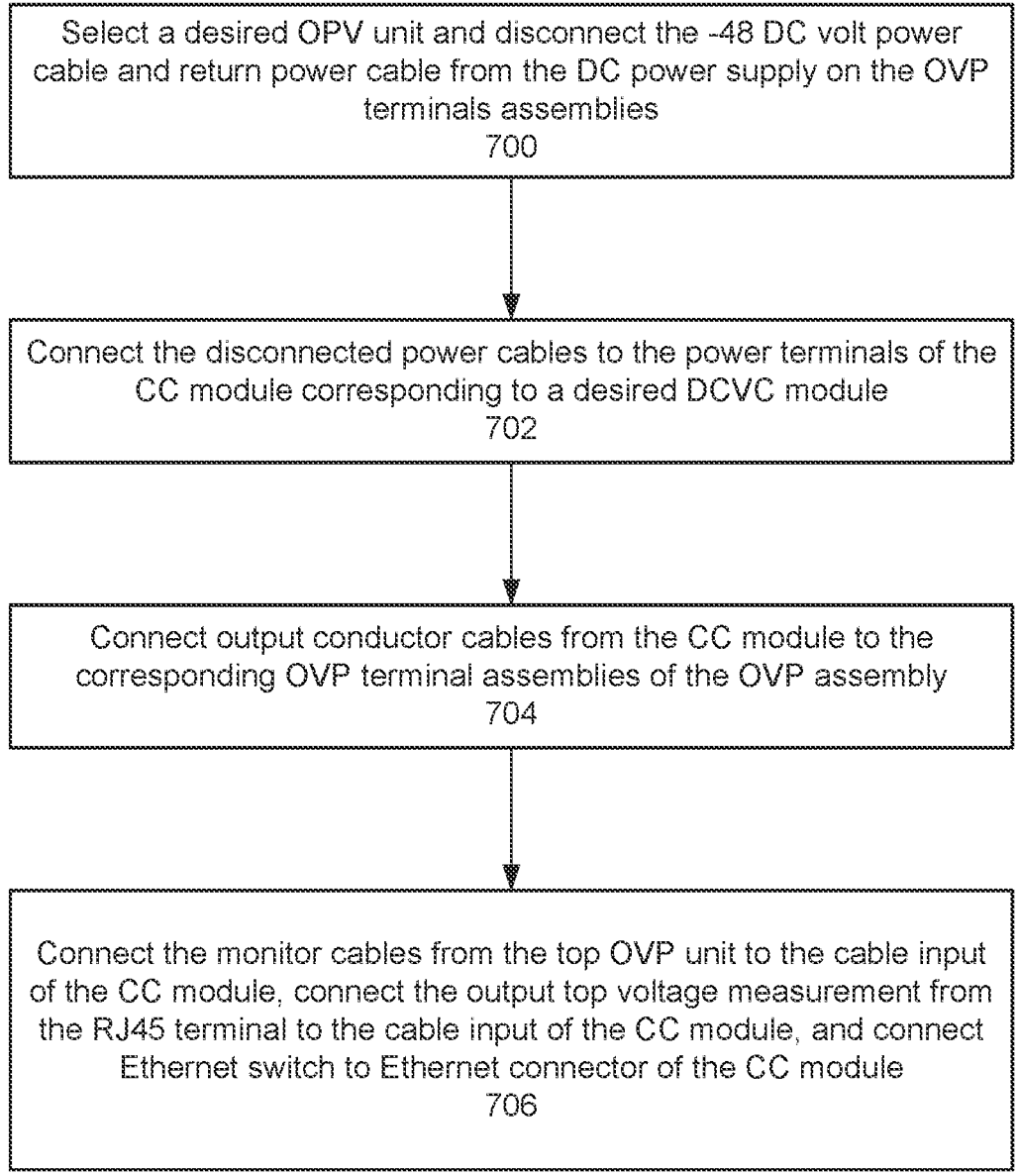
FIG. 7A illustrates a flow diagram of a process for electrically connecting the power conversion retrofit system to the wireless communication system.

FIG. 7A illustrates a flow diagram of a process for electrically connecting the power conversion retrofit system 500 to the wireless communication system. Typically, the base overvoltage protection unit 260 is already connected to the DC power supply (DCPS) 102 and the RRHs 122. After the power conversion retrofit system 500 is mechanically installed in the base overvoltage protection unit 260, the user can connect the power conversion retrofit system 500 to the DCPS 102 and to the RRHs 122.

The process may begin by the user selecting a desired SPD 112 and disconnecting the −48 DC volt power cable 132A and return power cable 132B from the DC power supply (DCPS) 102 on the OVP terminals assemblies 230 (FIG. 4) of the OVP assembly 302 (block 700). By way of example, that a user wants to conversion the voltage of one of the RRHs 122 connected to one of the DC circuits 131 (FIG. 1) designated as "OVP6" using an installed DCVC module 502 designated "A3". The user would first disconnect the DC power cables (RTN and −48 Vdc) from the OVP terminals assemblies 230 labeled "OVP6".

Figure 7B:
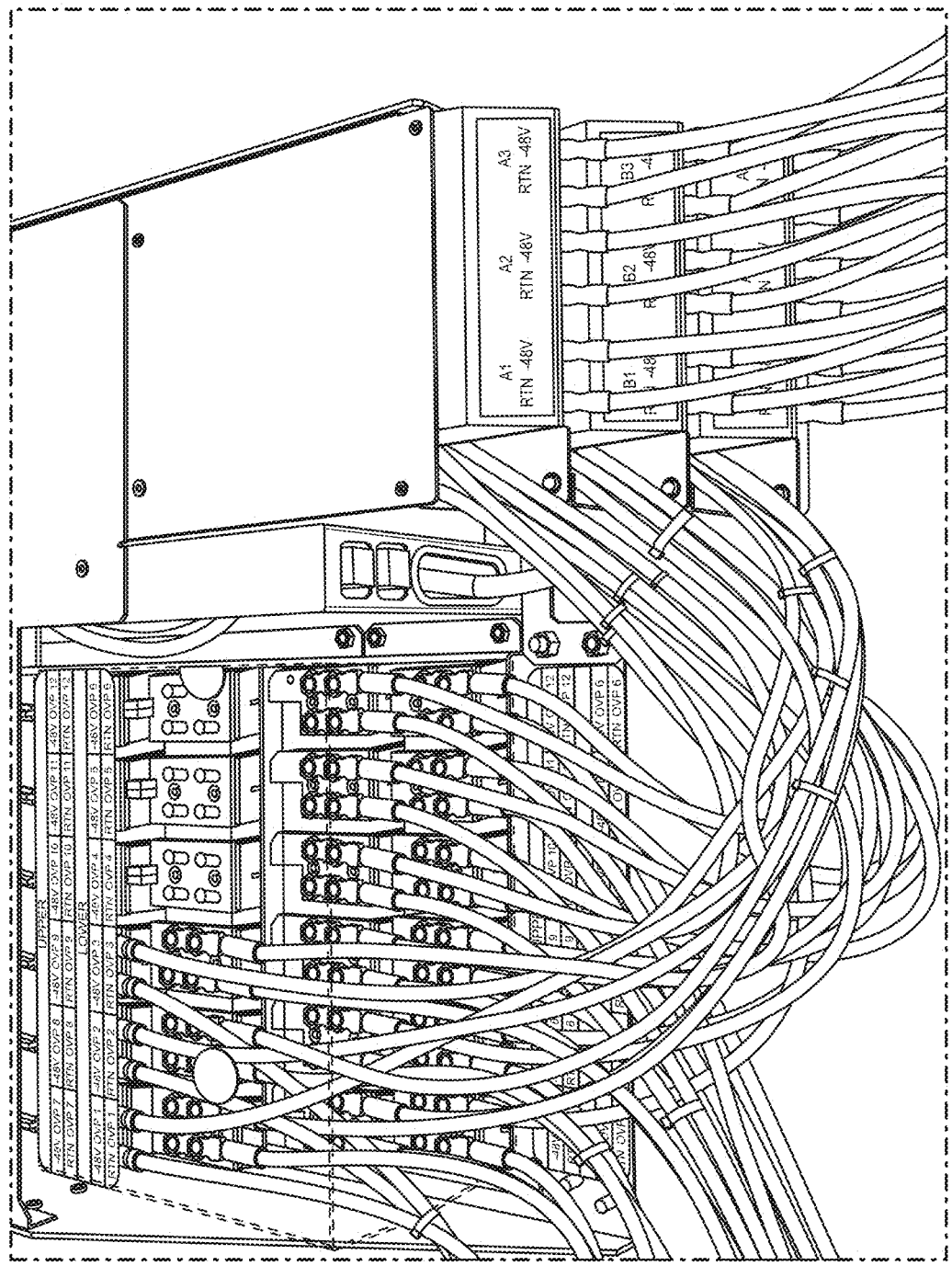
FIG. 7B shows an example of connecting output conductor cables between the CC module to corresponding OVP terminals.
Figure 7C:
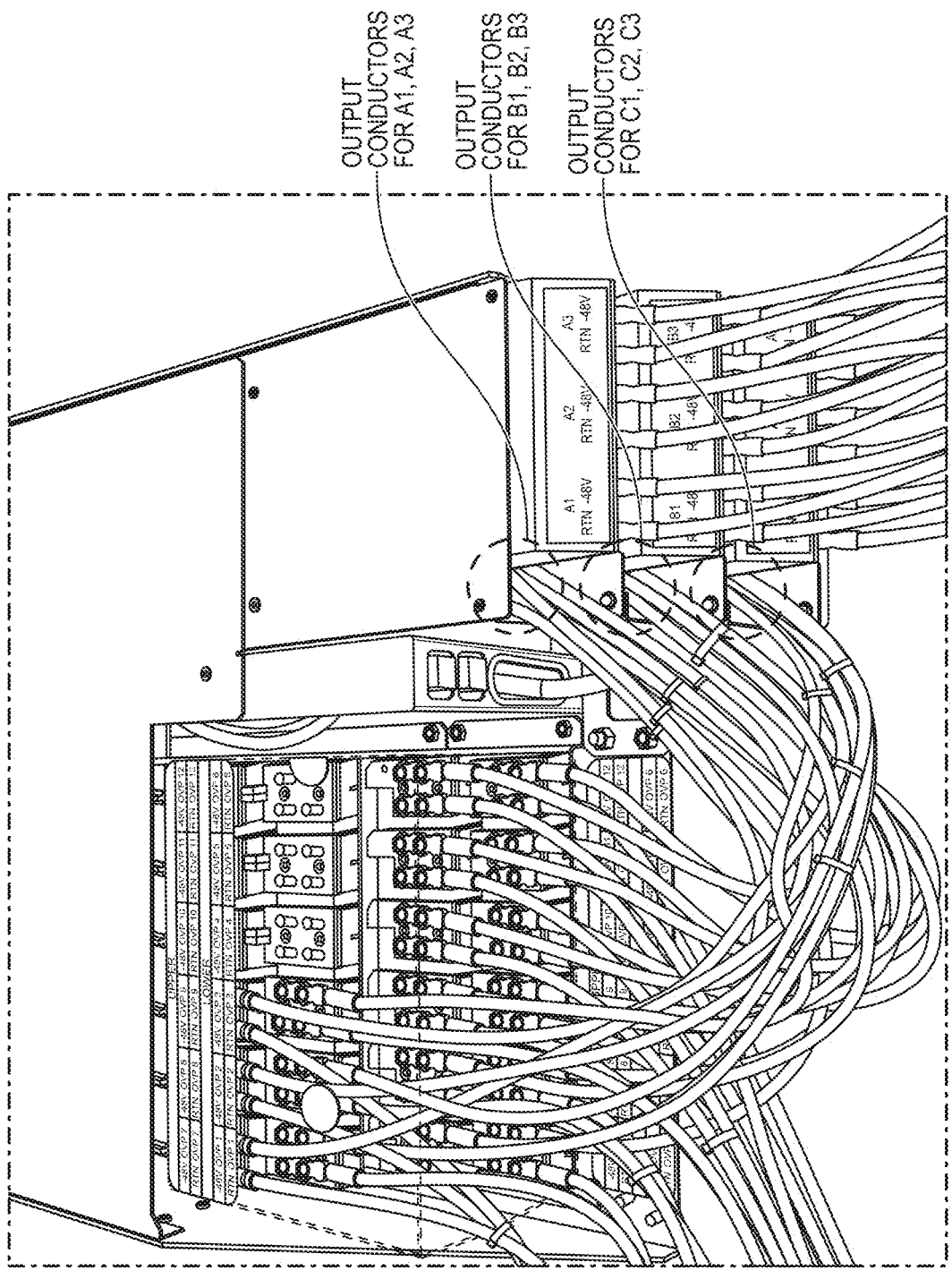
FIG. 7C is an example showing that each DC slot of the power conversion retrofit system can boost one DC circuit.

The user then connects the disconnected power cables 132A and 132B to the power terminals 508 of the CC module 504 corresponding to a desired DCVC module 502 (block 702). In the example, the user would connect the DC power cables (RTN and −48 Vdc) to a rear unit terminal of the DCVC module 502 labeled "A3", as shown in FIG. 7B.

Next, the user connects output conductor cables from the CC module 504 to the corresponding OVP terminal assemblies 230 of the OVP assembly 302 (FIG. 4) (Block 704). Referring to FIG. 7C, each DC slot (for example A1, A2, A3, B1, etc.) of the power conversion retrofit system can boost one DC circuit. The boosted output conductors (DC line and RTN) extend out of the CC module 504, as shown. Boosted output conductors for A1, A2, and A3 extend out of the top PCB, boosted output conductors for B1, B2, B3 extend out of the middle PCB, and boosted output conductors for C1, C2, and C3 extend out of the bottom PCB. The output conductors of DC slot A3 of the CC module 504 are shown connected to empty OVP6 terminals (from step 1).

Referring again to FIG. 7A, the user connects the monitor cables 264 from the top OVP unit 220 to the cable input 232 of the OVP unit, connects the output top voltage measurement from the RJ45 terminal of the OVP (second 232 terminal) to the cable input 514 of the CC module 504, and connects Ethernet switch to Ethernet connector 512 of the CC module 504 (block 706).

Figure 7D:
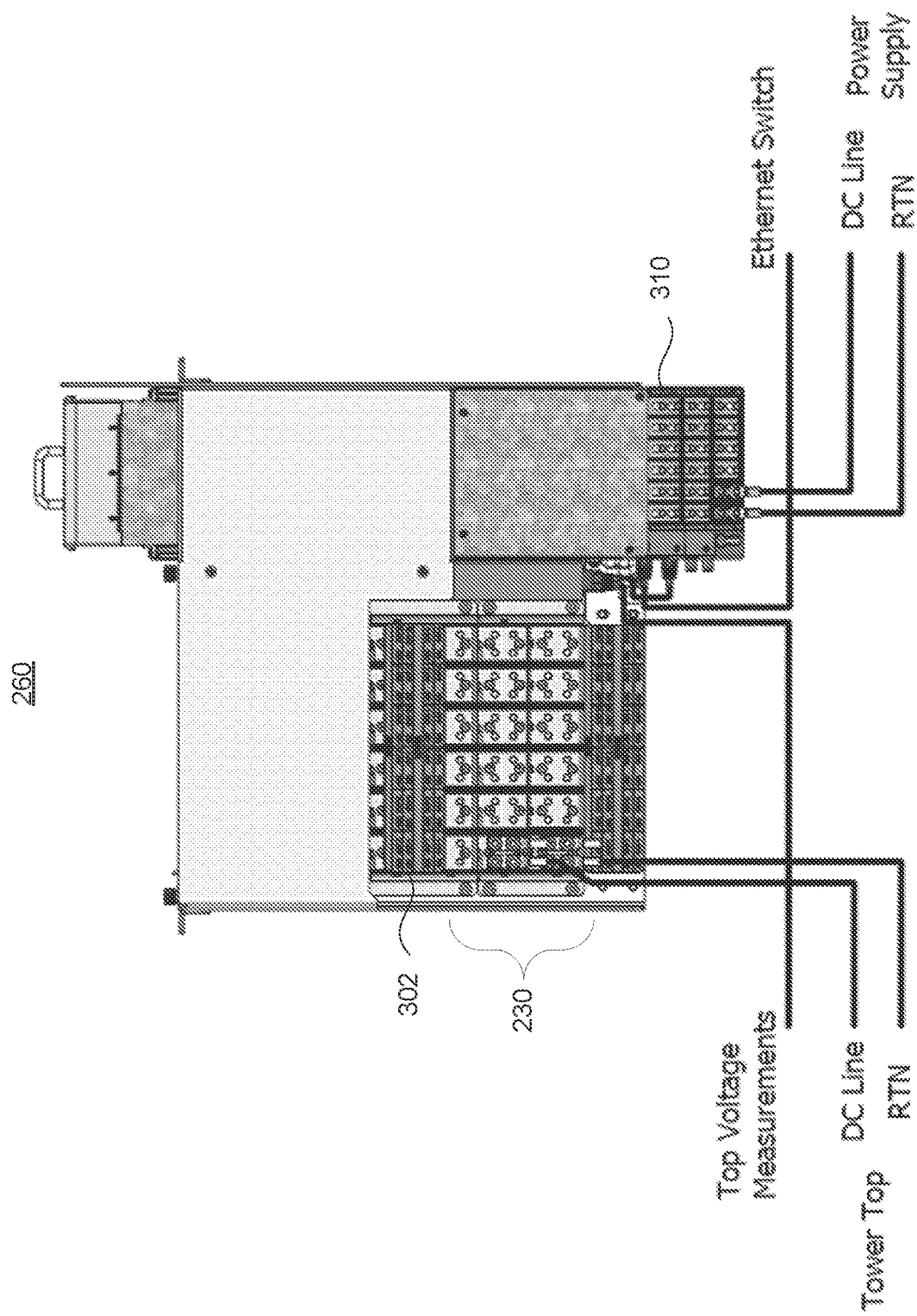
FIG. 7D illustrates the base overvoltage protection unit after installation of the power conversion retrofit system.

FIG. 7D illustrates the base overvoltage protection unit 260 after installation of the power conversion retrofit system.

FIG. 8 illustrates a table providing an overview of the maximum power delivered by retrofitted base overvoltage protection unit 260 to the RRH 122 and the maximum loop circuit length for various gauge trunk cables and targeted top RRH voltages.

The power conversion retrofit system 500 offers the following benefits to the operator:
- No additional rack space is required (redundant space within the OVP rack is used);
- Prolongs the operation of the batteries when there is a power cutoff, as the batteries can operate at their lowest voltage of around −42 Vdc (and keep the radio voltage above −40 Vdc. NOTE that if the system is without the power conversion system, the radio input voltage will drop below −40 Vdc when the battery voltage is at −50 Vdc, when there is a 10V voltage drop on the cable, so the batteries would not be able to last for a long period of time and when the Radio will disconnect there will still be a charge.);
- Eliminates the need to upgrade to larger conductors when newer generation high-power;
- RRHs are added (maximizes the power transmitted to the RRH at a given rated current trunk cable);
- Increases energy efficiency in high power RRH/AAS installations;
- Full remote monitoring and control of the system (controller installed in the RCC Module is equipped with RL45 jack to provide information to a server);
- Future proof solution (able to support next generation of high power RRHs with current demands to 50 A); and
- Modularity in design provides flexible site deployments.

A method and system for a power conversion retrofit system has been disclosed. The present invention has been described in accordance with the embodiments shown, and there could be variations to the embodiments, and any variations would be within the spirit and scope of the present invention. Accordingly, many modifications may be made by one of ordinary skill in the art without departing from the spirit and scope of the appended claims.

What is claimed is:

1. A power conversion retrofit system for a power communications system having an existing base overvoltage protection (OVP) unit, wherein one end of DC power cables is connected to remote radio heads (RRHs), the power conversion retrofit system comprising:
   one or more pluggable DC voltage conversion (DCVC) modules containing DC-DC converters inserted into respective slots in a first side of an enclosure of the base OVP unit; and
   a connectivity and control (CC) module inserted into a second side of the enclosure to mate with the DCVC modules and to connect with an opposite end of DC power cables.

2. The power conversion retrofit system of claim 1, wherein the slots were originally designed to contain fiber optical modules.

3. The power conversion retrofit system of claim 2, wherein during installation, the fiber optical modules from the slots are removed and the slots are repurposed to retain the DCVC modules.

4. The power conversion retrofit system of claim 1, wherein the DCVC modules have respective front sides and back sides, and the DCVC modules are inserted into the respective slots such that the front side is at least coplanar or extends past a front face of the enclosure, and the back side is located inside the enclosure.

5. The power conversion retrofit system of claim 1, wherein CC module has respective front sides and back sides, and inserted into a rear of the enclosure such that the front side is coplanar or extends past a back of the enclosure, and the back side is located inside the enclosure and mates with the DCVC modules via connectors.

6. The power conversion retrofit system of claim 1, wherein the enclosure is provided with a separation wall to secure the CC module in place, the separation wall including a set slots matching the respective slots in a front of the enclosure to allow connectors on back of the DCVC modules to mate with rear connectors on the CC module.

7. The power conversion retrofit system of claim 1, wherein output conductors of the CC module are connected to power terminals in the OVP unit.

8. The power conversion retrofit system of claim 1, wherein the OVP unit includes one or more surge protective devices (SPDs).

9. The power conversion retrofit system of claim 8, wherein the OVP unit further includes:
   a monitor board attached to a back of a front face of the OVP unit;
   a first set of bus bars attaching one or more rows of the SPDs to the monitor board; and
   a second set of bus bars attaching the one or more rows of the SPDs to one or more rows of terminal assemblies.

10. A method for retrofitting a power communications system with a power conversion system, the power communications system having an existing base overvoltage protection (OVP) unit, wherein one end of DC power cables is connected to remote radio heads (RRHs), the method comprising:
    inserting one or more pluggable DC voltage conversion (DCVC) modules containing DC-DC converters into respective slots in a first side of an enclosure of the base OVP unit; and
    inserting a connectivity and control (CC) into a second side of the enclosure to mate with the DCVC modules and to connect with an opposite end of DC power cables.

11. The method of claim 10, further comprising: fixing an output of the DC-DC converters to the RRHs at an elevated voltage compared to a voltage of power input to the method.

12. The method of claim 10, wherein the slots were originally designed to contain fiber optical modules.

13. The method of claim 12, further comprising: during installation, removing the fiber optical modules from the slots and repurposing the slots to retain the DCVC modules.

14. The method of claim 10, wherein the DCVC modules have respective front sides and back sides, the method further comprising: inserting the DCVC modules into the respective slots such that the front side is at least coplanar or extends past a front face of the enclosure, and the back side is located inside the enclosure.

15. The method of claim 10, wherein CC module has respective front sides and back sides, the method further comprising inserting the CC module into a rear of the enclosure such that the front side is coplanar or extends past a back of the enclosure, and the back side is located inside the enclosure and mates with the DCVC modules via connectors.

16. The method of claim 10, further comprising: providing the enclosure with a separation wall to secure the CC module in place, the separation wall including a set slots matching the respective slots in a front of the enclosure to allow connectors on back of the DCVC modules to mate with rear connectors on the CC module.

17. The method of claim 10, further comprising: connecting output conductors of the CC module to power terminals in the OVP unit.

18. The method of claim 10, further comprising: providing the OVP unit with one or more surge protective devices (SPDs).

19. The method of claim 18, further comprising providing the OVP unit with:
- a monitor board attached to a back of a front face of the OVP unit;
- a first set of bus bars attaching one or more rows of the SPDs to the monitor board; and
- a second set of bus bars attaching the one or more rows of the SPDs to one or more rows of terminal assemblies.

20. A method for mechanically installing a power conversion retrofit system including a one or more DC voltage conversion (DCVC) modules containing DC-DC converters and a connectivity and control (CC) module in an existing base overvoltage protection (OVP) unit of a wireless communication system, the base OVP unit connected to one end of DC power cables and an opposite end connected to remote radio heads (RRHs), the method comprising:
- removing any existing fiber optical modules mounted in slots within an opening in an enclosure of the base OVP unit;
- utilizing a separation wall in the enclosure at approximately a midway point of the opening;
- inserting the CC module into a back of the opening in the enclosure and securing a backside of the CC module to the separation wall; and
- inserting the one or more DCVC modules into respective slots of the enclosure so that the backside of the DCVC modules mate with power terminals on back to the CC module.

21. The method of claim 20, wherein utilizing the separation wall further includes: attaching the separation wall to an internal frame of the enclosure with screws.

22. The method of claim 20, wherein inserting the CC module into a back of the opening in the enclosure further includes: connecting a cable inside the enclosure between a display connector to a connector on back of a monitor board, and plugging in an Internet cable into an Ethernet connector on the CC module.

23. The method of claim 20, wherein inserting the one or more DCVC modules into respective slots of the enclosure further includes: installing separation trays in the slots that hold the DCVC modules.

\* \* \* \* \*